US 8,261,486 B2

(12) United States Patent
Bissonnette et al.

(10) Patent No.: US 8,261,486 B2
(45) Date of Patent: Sep. 11, 2012

(54) SYSTEMS AND METHODS FOR CONTROLLING LIQUID DELIVERY AND DISTRIBUTION TO PLANTS

(75) Inventors: W. Michael Bissonnette, Boulder, CO (US); Robert E. Wainwright, Napanee (CA); Carson Payne, Niwot, CO (US); John Thompson, Boulder, CO (US); Robert Bromley, Littleton, CO (US); Curt Morgan, Huntington Beach, CA (US)

(73) Assignee: AeroGrow International, Inc., Boulder, CO (US)

( * ) Notice: Subject to any disclaimer, the term of this patent is extended or adjusted under 35 U.S.C. 154(b) by 193 days.

(21) Appl. No.: 11/654,164

(22) Filed: Jan. 16, 2007

(65) Prior Publication Data

US 2007/0271842 A1 Nov. 29, 2007

Related U.S. Application Data

(63) Continuation-in-part of application No. 10/528,110, filed as application No. PCT/US2004/030168 on Sep. 15, 2004.

(51) Int. Cl.
*A01G 31/00* (2006.01)
(52) U.S. Cl. ............ 47/59 R; 47/62 R; 47/62 E; 47/79; 47/82; 47/63
(58) Field of Classification Search .......... 47/59 R, 47/62 R, 62 E, 63, 61, 79, 82; 119/72, 74, 119/75
See application file for complete search history.

(56) References Cited

U.S. PATENT DOCUMENTS

| 1,810,236 | A | | 6/1931 | Bender |
| 2,011,897 | A | | 8/1935 | Hauck |
| 2,198,309 | A | * | 4/1940 | James ........................ 177/117 |
| 2,431,890 | A | | 12/1947 | Raines |
| 2,720,725 | A | | 10/1955 | Peerless |
| 2,855,725 | A | | 10/1958 | Carothers |
| 3,078,985 | A | | 2/1963 | Robinson |
| 3,082,575 | A | | 3/1963 | Schulz |
| D195,095 | S | | 4/1963 | Bardos |
| 3,137,096 | A | | 6/1964 | Hopkins |
| 3,168,797 | A | * | 2/1965 | Patassy .......................... 47/79 |
| 3,608,238 | A | | 9/1971 | Reuter |
| 3,660,933 | A | | 5/1972 | Wong, Jr. |
| 3,812,619 | A | | 5/1974 | Wood et al. |

(Continued)

FOREIGN PATENT DOCUMENTS

CA 2335311 8/2002

(Continued)

OTHER PUBLICATIONS

U.S. Appl. No. 12/073,985, Bissonnette et al.
EZHydroKit EZ Grow Guide, 2003, EzHydroKit, LLC, www.EzHydroKit.com.
EZHydroKit Hydroponics FAQ, 2004, pp. 1-6, EzHydroKit, LLC, www.EzHydroKit.com.
H.M. Resh, "Hydroponic Food Production", 2001, pp. 34-118, Sixth Edition, Woodbridge Press Publishing Company, Santa Barbara, CA, USA.

(Continued)

*Primary Examiner* — Andrea Valenti
(74) *Attorney, Agent, or Firm* — Hamilton DeSanctis & Cha, LLP

(57) ABSTRACT

This invention provides a system and methods for providing liquid to a plant or a seed that can germinate into a plant. The system includes: a liquid delivery device; an actuator; a vessel; and a vessel support; wherein the actuator is operable to cause the liquid delivery device to deliver the liquid to the plant or seed only when the vessel is brought into proximity with the vessel support.

16 Claims, 21 Drawing Sheets

U.S. PATENT DOCUMENTS

| | | | |
|---|---|---|---|
| 3,830,013 A | 8/1974 | Lesley | |
| 3,961,444 A | 6/1976 | Skaife | |
| 3,973,355 A | 8/1976 | McKenzie | |
| D242,941 S | 1/1977 | Nagata | |
| D244,838 S | 6/1977 | LeBreux | |
| 4,051,631 A | 10/1977 | Jones, III | |
| 4,059,922 A | 11/1977 | DiGiacinto | |
| 4,075,785 A | 2/1978 | Jones | |
| 4,124,953 A | 11/1978 | Patton | |
| 4,170,844 A | 10/1979 | Steele | |
| 4,175,355 A | 11/1979 | Dedolph | |
| 4,177,604 A | 12/1979 | Friesen | |
| 4,198,783 A | 4/1980 | Leroux | |
| 4,211,034 A | 7/1980 | Piesner | |
| 4,221,749 A | 9/1980 | Dedolph | |
| 4,236,353 A | 12/1980 | Sorenson | |
| 4,255,896 A | 3/1981 | Carl | |
| 4,302,906 A | 12/1981 | Kawabe et al. | |
| 4,310,990 A | 1/1982 | Payne | |
| 4,332,105 A | 6/1982 | Nir | |
| 4,392,327 A | 7/1983 | Sanders | |
| 4,403,443 A | 9/1983 | Valente | |
| 4,407,092 A | 10/1983 | Ware | |
| 4,420,903 A | 12/1983 | Ritter et al. | |
| 4,454,684 A | 6/1984 | O'Hare | |
| 4,495,310 A | 1/1985 | Dedolph | |
| 4,584,791 A | 4/1986 | Wolf | |
| 4,602,906 A | 7/1986 | Grunenfelder | |
| 4,669,217 A | 6/1987 | Fraze | |
| RE32,476 E | 8/1987 | Kistner | |
| 4,769,262 A | 9/1988 | Ferrar et al. | |
| 4,790,105 A | 12/1988 | Wareing et al. | |
| 4,791,754 A | 12/1988 | Demars, Jr. | |
| 4,803,803 A | 2/1989 | Moffet | |
| 4,934,096 A | 6/1990 | Bentvelsen | |
| 4,937,972 A * | 7/1990 | Freitus | 47/62 R |
| 4,976,064 A | 12/1990 | Julien | |
| 4,979,332 A | 12/1990 | Nagaya et al. | |
| 4,991,345 A | 2/1991 | Bloch | |
| 5,010,686 A | 4/1991 | Rivest | |
| 5,020,275 A * | 6/1991 | Bednarzik | 47/79 |
| 5,054,234 A | 10/1991 | Cassells | |
| 5,067,275 A | 11/1991 | Constance | |
| D323,794 S | 2/1992 | Wianecki | |
| 5,136,804 A | 8/1992 | Rothem et al. | |
| 5,201,141 A | 4/1993 | Ahm | |
| 5,224,292 A | 7/1993 | Anton | |
| 5,224,295 A | 7/1993 | Izzard | |
| 5,224,598 A | 7/1993 | Angeles et al. | |
| 5,252,108 A | 10/1993 | Banks | |
| D342,335 S | 12/1993 | Bowlby | |
| 5,269,094 A | 12/1993 | Wolverton et al. | |
| 5,287,652 A * | 2/1994 | Delp | 47/79 |
| 5,347,753 A | 9/1994 | Dall | |
| D352,478 S | 11/1994 | Whittle et al. | |
| 5,363,593 A | 11/1994 | Hsh | |
| 5,394,647 A | 3/1995 | Blackford | |
| 5,430,972 A | 7/1995 | Wianecki | |
| 5,440,836 A | 8/1995 | Lee | |
| D366,226 S | 1/1996 | Foutes | |
| 5,502,923 A | 4/1996 | Bradshaw | |
| 5,525,505 A | 6/1996 | Young et al. | |
| 5,546,700 A | 8/1996 | Kumpf | |
| 5,555,676 A * | 9/1996 | Lund | 47/82 |
| 5,557,884 A | 9/1996 | Deppe | |
| 5,561,946 A | 10/1996 | Hsien et al. | |
| 5,732,505 A | 3/1998 | Carlson et al. | |
| 5,771,634 A | 6/1998 | Fudger | |
| D397,521 S | 8/1998 | Gomi | |
| 5,799,439 A | 9/1998 | MacGregor | |
| 5,860,247 A * | 1/1999 | Newby | 47/59 R |
| 5,927,006 A | 7/1999 | Elliott | |
| 5,934,011 A | 8/1999 | Ishioka | |
| 5,950,363 A | 9/1999 | Rotondo | |
| 5,964,520 A * | 10/1999 | Lee | 362/294 |
| D416,102 S | 11/1999 | Schulman et al. | |
| 6,021,602 A | 2/2000 | Orsi | |
| 6,047,572 A * | 4/2000 | Bliven et al. | 70/58 |
| 6,070,359 A | 6/2000 | Liu | |
| 6,085,461 A | 7/2000 | Brisson | |
| 6,088,958 A | 7/2000 | Oka et al. | |
| 6,120,008 A | 9/2000 | Littman et al. | |
| 6,219,966 B1 | 4/2001 | Lapointe et al. | |
| 6,240,674 B1 | 6/2001 | Otake et al. | |
| 6,247,268 B1 | 6/2001 | Auer | |
| 6,276,089 B1 | 8/2001 | Boisclair et al. | |
| 6,314,675 B1 | 11/2001 | Costa | |
| 6,405,482 B1 | 6/2002 | Skaife | |
| 6,418,663 B1 | 7/2002 | Smith | |
| 6,516,563 B1 | 2/2003 | Matthews | |
| 6,555,219 B2 | 4/2003 | Kosinski | |
| 6,601,339 B1 | 8/2003 | Parker et al. | |
| 6,615,539 B1 | 9/2003 | Obonai et al. | |
| 6,634,138 B2 | 10/2003 | Katzman | |
| 6,766,817 B2 | 7/2004 | Da Silva | |
| 6,918,404 B2 | 7/2005 | Dias da Silva | |
| 7,066,586 B2 | 6/2006 | Da Silva | |
| 7,069,691 B2 | 7/2006 | Brooke et al. | |
| 2001/0047617 A1 | 12/2001 | Blossom | |
| 2001/0054252 A1 | 12/2001 | Kleinwachter | |
| 2002/0104263 A1 | 8/2002 | Chang | |
| 2002/0184820 A1 * | 12/2002 | Mauney | 47/60 |
| 2003/0000140 A1 | 1/2003 | Ahm | |
| 2003/0056437 A1 | 3/2003 | Costa | |
| 2003/0085791 A1 * | 5/2003 | Ramahi et al. | 337/379 |
| 2003/0089037 A1 | 5/2003 | Ware | |
| 2003/0167688 A1 | 9/2003 | Atchley et al. | |
| 2003/0213170 A1 | 11/2003 | Snead et al. | |
| 2003/0213171 A1 | 11/2003 | Kruer et al. | |
| 2003/0221366 A1 | 12/2003 | Weiner et al. | |
| 2003/0233787 A1 | 12/2003 | Hartman | |
| 2004/0049980 A1 | 3/2004 | Principe et al. | |
| 2005/0011118 A1 | 1/2005 | Umbaugh | |
| 2005/0076565 A1 | 4/2005 | Terrell | |
| 2005/0102895 A1 | 5/2005 | Bissonnette et al. | |
| 2005/0246954 A1 | 11/2005 | Bissonnette et al. | |
| 2005/0246955 A1 | 11/2005 | Bissonnette et al. | |
| 2005/0257424 A1 | 11/2005 | Bissonnette et al. | |
| 2005/0274824 A1 | 12/2005 | Brooke et al. | |
| 2006/0179711 A1 | 8/2006 | Bissonnette et al. | |
| 2006/0254332 A1 | 11/2006 | Bissonnette et al. | |
| 2006/0272205 A1 | 12/2006 | Bissonnette et al. | |
| 2006/0272210 A1 | 12/2006 | Bissonnette et al. | |
| 2007/0271841 A1 | 11/2007 | Bissonnette et al. | |
| 2008/0083163 A1 * | 4/2008 | Amsellem et al. | 47/66.6 |
| 2008/0302002 A1 * | 12/2008 | Schmidt | 47/48.5 |

FOREIGN PATENT DOCUMENTS

| | | |
|---|---|---|
| DE | 3718288 A | 12/1988 |
| DE | 3917463 A1 | 12/1989 |
| EP | 0 042 697 | 12/1981 |
| EP | 0 052 264 | 5/1982 |
| EP | 0473847 A1 | 9/1990 |
| FR | 2615687 A1 | 12/1988 |
| GB | 1599939 | 4/1978 |
| GB | 2216378 | 10/1989 |
| JP | 62-269624 | 11/1987 |
| JP | 63-039517 A | 2/1988 |
| JP | 01-262736 A | 10/1989 |
| JP | 04-144621 A | 5/1992 |
| JP | 04-200328 A | 7/1992 |
| JP | 05-227835 | 9/1993 |
| JP | 06-133646 A | 5/1994 |
| JP | 09-140282 A | 6/1997 |
| JP | 11-103701 A | 4/1999 |
| WO | WO 94/06274 | 3/1994 |
| WO | WO 94/13129 | 6/1994 |
| WO | WO 2005/055700 | 6/2005 |

OTHER PUBLICATIONS

Bubel, Nancy, "The New Seed Starters Handbook", 1988, pp. 28-35, Rodale Press, Emmaus, PA, USA.

General Hydroponics Waterfarm®, printed Jun. 7, 2007, 1 page.

* cited by examiner

FIG. 6
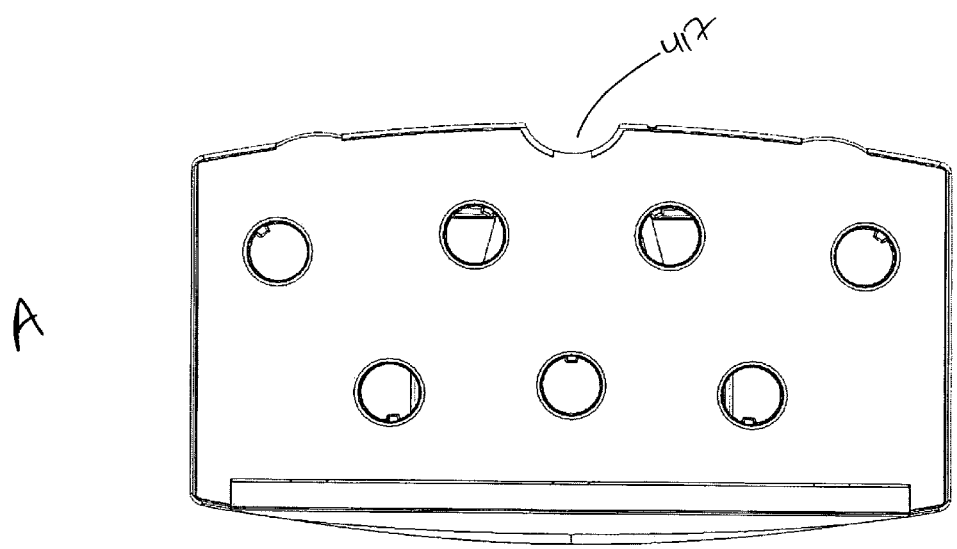
A
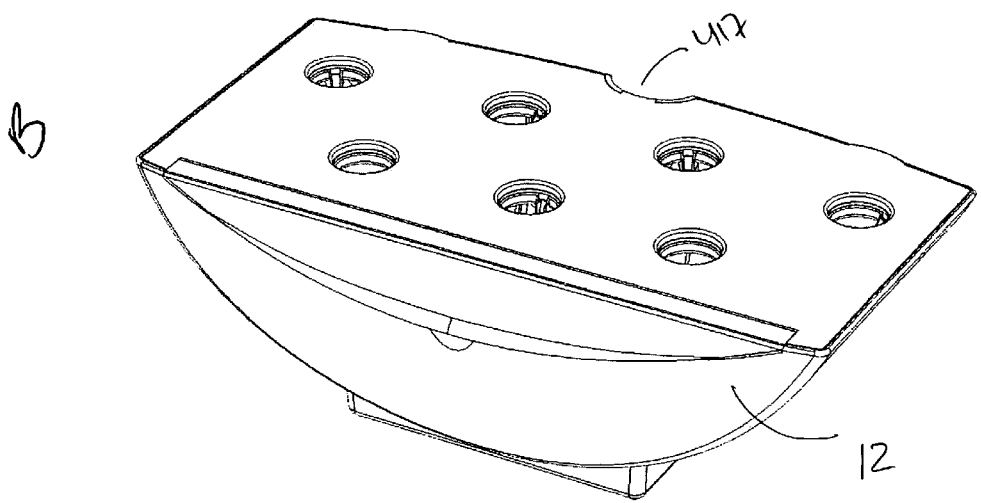
B

FIG. 7
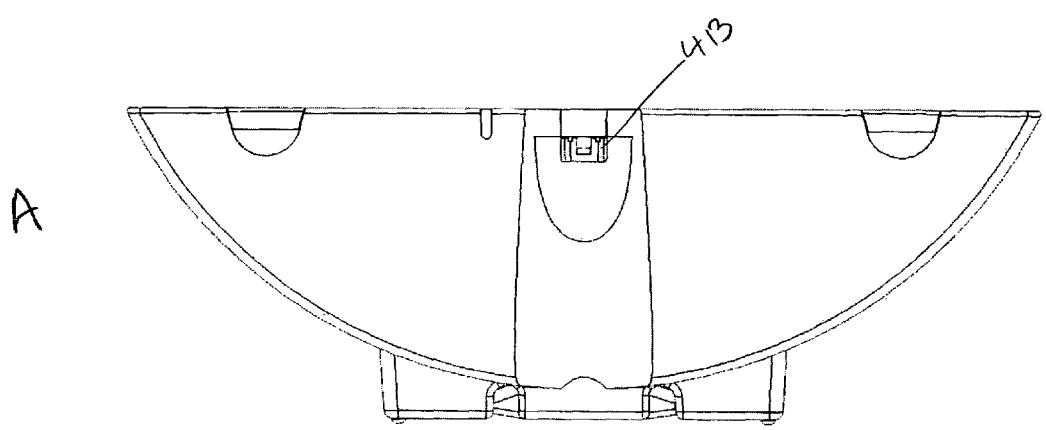
A
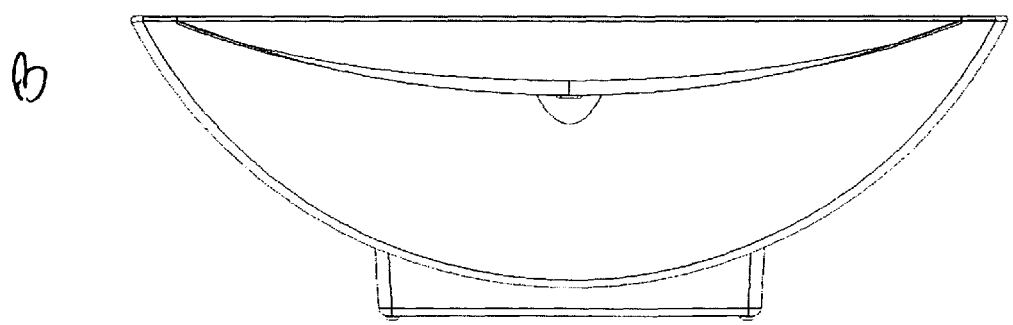
B

FIG 11
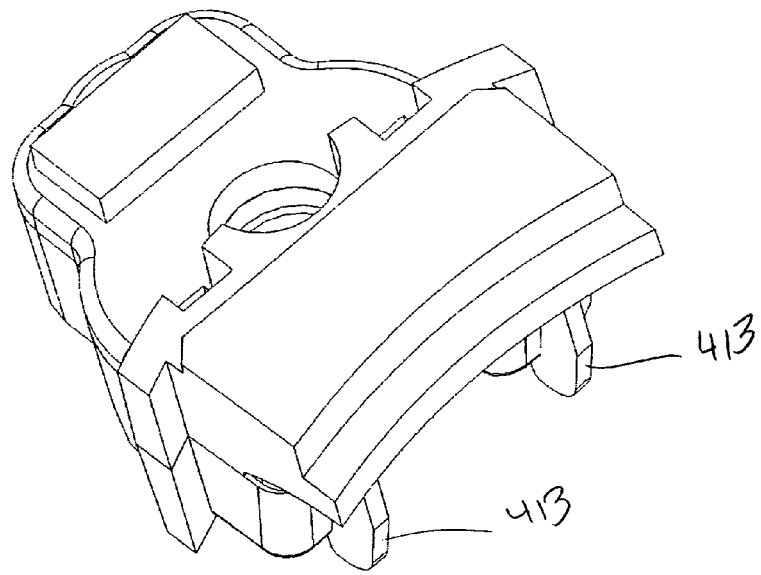
A
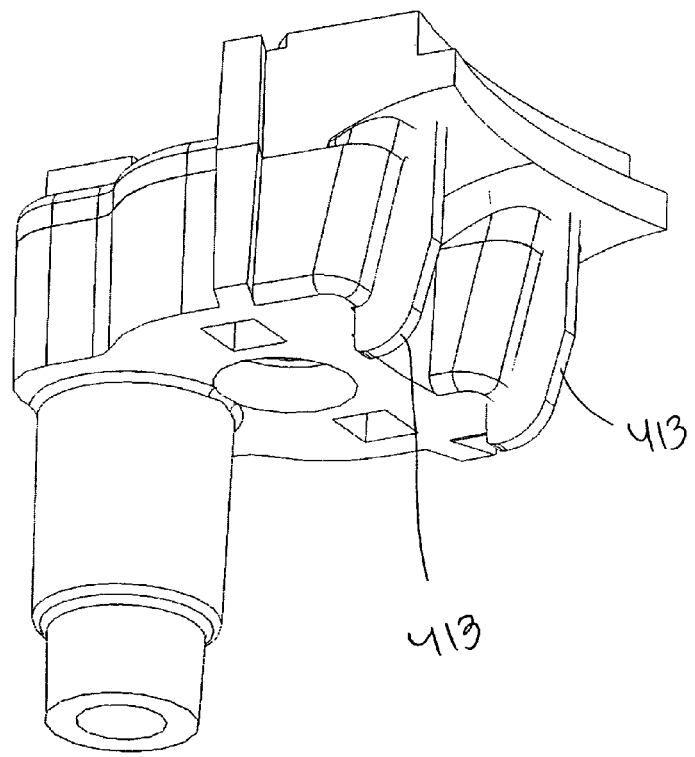
B

SYSTEMS AND METHODS FOR CONTROLLING LIQUID DELIVERY AND DISTRIBUTION TO PLANTS

CROSS-REFERENCE TO RELATED APPLICATIONS

This application is a Continuation-in-Part of U.S. application Ser. No. 10/528,110, filed Mar. 16, 2005, which is a National Stage Application under 35 U.S.C. 371 of International Application Serial No. PCT/US2004/030168, filed Sep. 15, 2004, and to Devices and Methods for Growing Plants, filed Jan. 12, 2007, all of which are incorporated herein by reference to the extent that there is no inconsistency with the present disclosure.

FIELD OF THE INVENTION

This invention is in the fields of plant agriculture, home gardening, indoor gardening, and hydroponics.

BACKGROUND

Hydroponics is the cultivation of plants without soil. Hydroponics provides healthier, disease-free plants, faster than growing in soil. In soil-less culture, plants are instead cultivated using a liquid solution of water and nutrients. There are 6 basic types of hydroponic systems: Wick, Raft (also called Water Culture), Ebb and Flow (also called Flood & Drain), Drip, Nutrient Film Technique, and Aeroponic. There are hundreds of variations on these basic types of systems, and most hydroponics systems can be described as a variation or combination of these six types.

Wick systems can be simple, passive systems, with no moving parts. Plants are grown in a soil-less growing medium and a solution containing water and nutrients is delivered using wicks that absorb the solution from a reservoir and deliver the solution to the growing medium. The roots of the plants are optionally prevented from or allowed to grow in the solution. Plant growth is limited by the delivery rate of the wicks and the amount of oxygen in the solution, which, unless supplemented, is often low.

Raft systems can also be very simple. Plants are grown in a soil-less growth medium that is floated by a raft on the surface of a solution containing water and nutrients. The roots of the plants are optionally prevented from or allowed to grow in the solution. Plant growth is limited by the amount of oxygen in the solution, which, unless supplemented, is often low.

Ebb and Flow systems are more complex. The plants are grown in a soil-less growth medium in a flooding tray. Solution containing water and nutrients is intermittently delivered to the flooding tray and then returned to a reservoir. The plant roots are directly or indirectly contacted by the solution in the flooding tray. Optionally the solution is delivered by a pump and returned by gravity. The flooding cycle is optionally controlled by a timer.

Drip systems are divided into recovery and non-recovery systems. Plants are grown in a soil-less growing medium. A solution containing water and nutrients is delivered in drips to the growing medium. The solution that is not used by the plants is either recycled (recovery systems) or discarded (non-recovery systems). In recovery systems, although there often is a reservoir, the plant roots are typically prevented from growing directly in the solution. Plant growth is limited by the amount of oxygen in the solution, which, unless supplemented, is often low.

Nutrient Film Technique (N.F.T.) systems constantly deliver a thin film of a nutrient and water containing solution. The plants are grown in a soil-less growth medium and the roots are allowed to grow outside the medium into the surrounding air or the plants are grown directly suspended in the air without a growing medium. The roots that grow in the air are constantly contacted by the thin film of solution. Typically the solution is recycled. Optionally the solution is delivered by a pump and returned by gravity. Because there is only a thin film of solution, the roots are very susceptible to drying out if the flow of nutrient solution is interrupted.

Aeroponic systems deliver the solution as a fine spray. The plants are grown in a soil-less growth medium and the roots are allowed to grow outside the medium into the surrounding air or the plants are grown directly suspended in the air without a growing medium. The roots that grow in the air are intermittently sprayed or misted with a solution containing water and nutrients. The roots of the plants are optionally prevented from or allowed to grow in the solution. Typically a timer is used to regulate the spraying cycle. Aeroponic systems often suffer from roots growing into and clogging the sprayers and from large roots close to the sprayer preventing roots further away from being sprayed, both requiring extensive maintenance or resulting in losses of plants. EP 0 052 264, filed Oct. 26, 1981, by Ein-Gedi, is an example of an Aeroponic system.

Aeroponics systems do not employ a means for supporting the roots in a liquid, or in a porous or particulate medium. In an aeroponic system, plants are supported over a chamber. The foliage of the plant extends upward from the outer surface of the chamber where it may be exposed to light and the roots extend downward into the chamber where they are suspended freely and are periodically exposed to a spray, forced mist, fog or other method of nutrient solution delivery. In an aeroponic system, nutrient delivery to the root structure of a plant is even more carefully regulated than in a hydroponic system.

U.S. Pat. No. 5,201,141, issued Apr. 13, 1993, describes a hydroponics system made from a pair of flatwise juxtaposed layers of water-impervious material, to make a system resembling an airless N.F.T. The system is not useful for germination of plant seeds; plants already having roots are inserted. Because the layers are flatwise, there is no distinct airspace in which roots are allowed to grow, and no liquid reservoir in which roots can grow is provided. No drops descend through air. This system does not allow growing medium to be used.

U.S. Pat. No. 5,440,836, issued Aug. 15, 1995, describes a multistory, stacked bed hydroponics system. No liquid solution is delivered to a reservoir without first contacting a growing medium, plant, or side wall of the reservoir. No drops descend through air.

Neither of the two previously mentioned hydroponics systems allow liquid drops to descend through a gas.

EzHydroKit (EzHydroKit, Tucson, Ariz.) is a drip system that uses rock wool as a growing medium. The rock wool is held in a net pot and micro tubing pumps solution to the net pot where it is sprayed into the net pot. The solution then returns to the reservoir, which must be kept at a level just below the net pots. Keeping the solution at a level just below the net pots prevents the formation of an air space. No liquid solution is delivered to a reservoir without first contacting a growing medium. The method for using the kit as described in their manual (EzGrowGuide™ 2003) requires that the rock wool be soaked overnight at pH 5.5 or less and requires the use of unfiltered water. The manual instructs that the drip system should not be used during the first two weeks of growth, including during germination. The solution is to be changed every 7-10 days, including the method step of pH balancing the water to pH 5.5. The manual instructs that the pump is never to be stopped except for when changing the solution.

U.S. Pat. No. 4,392,327, issued Jul. 12, 1983, and EP 0 042 697, published Dec. 30, 1981, describe a hydroponics system having upper and lower compartments formed of flexible plastics. This system is not useful for germination; plants are added when they already have formed a root ball. In the non-wicking systems, liquid is delivered above the plant transition region. No liquid is delivered to a reservoir without first contacting a growing medium or a compartment wall.

U.S. Pat. No. 6,088,958, issued Jul. 18, 2000, describes a hydroponic system for growing potatoes using a stolon partition member to prevent lenticel hypertrophy. This system is not useful for any plants other than potatoes and is not useful during germination. Liquid is not delivered to the plant at the height of the transition region or to each plant separately.

Neither of the three previously mentioned hydroponics systems is useful for plant seed germination.

U.S. Pat. No. 4,310,990, issued Jan. 19, 1982, describes a hydroponics system made from interfitting tubular elements. No liquid solution is delivered to a reservoir without first contacting a growing medium, and no amount of solution deeper than a thin film is allowed to be inside the lower channel, therefore roots never grow within a solution reservoir.

U.S. Pat. No. 5,394,647, issued Mar. 7, 1995, describes an aeroponic hydroponics system. A horizontal divider separates the roots from the reservoir, preventing the roots from being immersed in the solution. No liquid solution is delivered to a reservoir without first contacting the divider and possibly also the growing medium and/or the plant roots.

WO 94/13129, published Jun. 23, 1994, describes a stacked hydroponics system, which is divided into three horizontal plant husbandry zones. Several methods for delivering liquid are described, however no liquid drops descend into a liquid reservoir. This system is not useful for germination.

Neither of the three previously mentioned hydroponics systems provides a reservoir for the growth of roots.

None of the previously mentioned hydroponics systems delivers liquid through a gas into a liquid reservoir, without having the liquid first contact a growing medium, a portion of a plant, or a wall of the reservoir vessel. None of the previously mentioned hydroponics systems allows liquid to descend in drops through a gas, delivers liquid directly to a liquid reservoir, and is useful for germination of plant seeds.

Hydroponics systems available in the art have been designed for large-scale agriculture. These systems do not work for the retail consumer because they are expensive, large, unsightly, and/or require extensive maintenance. The consumer also had different goals compared to large-scale agriculture; the consumer's concern for harvest quality greatly outweighs the concern for production quantity. There is a need in the art for devices and methods that allow consumers to grow a large variety of plants, in a large variety of contexts, using a large variety of methods. Consumers have a diverse array of demands. A successful product must accommodate a diversity of aesthetic requirements (e.g., visual, auditory, gustatory) and a wide range of reasons for growing (e.g., alternative plant varieties, alternative horticultural methods). Many individuals have little or no experience growing their own food, yet others have extensive experience gardening. Consumers have access to a diversity of water quality, historically a critical factor for successful hydroponic growing. One characteristic consumers typically share is they have a limited amount of space available for growing food and ornamental plants. There is a need in the art for products that allow consumers to easily grow tasty, nutritious, healthy, and/or beautiful fruits, vegetable, herbs, spices, and flowers from seed through harvest in their own homes, even when they have no previous experience growing plants, yet also provides a superior experience for master gardeners. Previous attempts by others to design such a product have failed due to system expense, complexity or simplicity, aesthetics, flexibility (plants number/variety or horticultural practices), lack of system robustness, and/or amount of prior knowledge or care required by the user. This invention provides devices that fit on a counter underneath standard cabinets, in a modern kitchen.

Plants need light, water, nutrients, oxygen, carbon dioxide, appropriate temperatures, and time in order to grow. This invention provides devices and methods for easily growing a wide variety of plants that are healthier and more nutritious than plants grown in soil. This invention provides a novel hydroponics system that is self-contained, useful for germination through harvest, useful for cuttings, is useful with low technology components, is useful for single plants through agricultural production, and provides more oxygen to the plant roots than other hydroponic systems.

It is known in the art that plants grow faster and healthier in the presence of negative ions. It is known in the art that flowforms oxygenate, revitalize, and rejuvenate water (Flowforms, Practical Hydroponics & Greenhouses, pp 60-61). However, no previously available hydroponics systems have incorporated negative ion generators, and/or flowforms inside a hydroponics device. This invention provides hydroponics devices that incorporate negative ion generators and/or flowforms within. The negative ion generators not only benefit the plants, but also the humans and animals in the vicinity. The flowforms continuously cleanse and oxygenate the recycled liquid, increasing the ranges of lower quality water sources that may be input into the devices of this invention.

A challenge in multiple plant container gardening is the even delivery of inputs to every plant. In hydroponics, the rate and method of liquid delivery is critical. Not enough moisture results in the plants dehydrating and dying. Too much water results in choking, drowning, and death. Containers fail when they hold too much or too little water. US 2003/0167688 (published Sep. 11, 2003) describes a plant root development container that has anti-circling channels and air channels, but none of the channels are for containing or guiding a flowing liquid. Although baskets, hydroponics containers, for containing growth media exist in the art, none direct incoming liquid around a contained plant or growth medium. This invention provides devices for regulating the flow of liquid to the growth medium and to each plant. These devices are particularly useful when initiating the flow of liquid, such as for germination, when the liquid must contact a dry, potentially shrunken, growth medium, to reach a dormant or germinating seed.

A challenge in consumer level hydroponics is incorporating a reliable method for reminding the user to regularly care for the growing plants. This invention provides a reliable method for reminding a user to care for the growing plants.

This invention provides a hydroponics device using a previously unknown liquid delivery system for the delivery of liquid. This invention provides hydroponic devices for oxygenating liquid and optionally for revitalizing and rejuvenating the liquid. This invention provides devices for consistently delivering a selected amount of liquid to the growth medium or plant in a hydroponics device. This invention provides previously unknown combinations of aspirator and venturi devices for oxygenating liquid within a hydroponics device. U.S. Pat. No. 6,120,008 (issued Sep. 19, 2000) describes an oxygenating apparatus, but it works under pressure greater than 1 atm and is not useful inside a hydroponics device.

This invention provides hydroponics devices that provide more oxygen than prior art hydroponics devices, resulting in faster growth, healthier plants, and larger or tastier harvests. The plants grown using hydroponics are more nutritious than plants grown in soil.

The devices of this invention are easy to use, and no plant-growing experience or green thumb is required. The hydroponics devices of this invention are self-contained, providing water, plant nutrients, oxygen, carbon dioxide, and photoradiation, providing everything most plants need to grow. The hydroponics devices of this invention are useful from germination through harvest and through plant senescence or plant death. The devices are useful for growing seedlings for transplantation into another growing system. The devices of this invention are useful for growing plants considered difficult to grow, including orchids and plants considered difficult to germinate, including parsley.

The devices of this invention provide a pleasant, soothing waterfall sound, or optionally are quiet. The devices provide negative ions for better plant health and for better health of the humans and animals in the surroundings.

The methods and devices of this invention are useful for single plants through large-scale agricultural operations. This invention provides devices that are less susceptible than other hydroponics systems to harming plants as a result of electricity failures.

Soil-less cultivation of plants can provide many advantages over traditional soil-based cultivation. In a soil-less medium, delivery of nutrients to plant roots can be regulated more easily in order to optimize plant growth. This is done by precisely controlling the composition of a nutrient solution, and then by controlling precisely the frequency that plant roots are exposed to the nutrient solution. Plants grow faster in a soil-less environment because plant roots are not required to expend the energy to push soil particles, and therefore have more energy available for growing.

In hydroponics techniques, plants are grown in the absence of soil and roots are maintained in a substantially liquid environment or humid environment. Instead of soil, the root mass of the plant is either supported within an essentially homogeneous synthetic or natural medium, which is either porous or particulate, or the root mass is immersed within a liquid, while the foliage of the plant is allowed to extend upward from the root support medium where it is exposed to light. Meanwhile, the root structure is exposed to a nutrient solution which may be either wicked up to the roots by means of a porous wicking medium or circulated by means of a pump irrigation system. Either way, nutrient delivery to the root mass may be carefully regulated.

Soil-less media for growing plants are generally composed of materials that have low water-retention characteristics, allowing liquid nutrient solution to flow readily to plant roots and then to drain away so that roots are not constantly soaked in a liquid that may foster rot or the growth of damaging fungi. Soil-less media may be composed of any number of suitable porous substances such as peat moss, wood bark, cellulose, pumice, plastic or polystyrene pellets, vermiculite or foam, for example.

Various soil-less plant growth media are disclosed in the prior art: For example, Dedolph (U.S. Pat. No. 4,221,749) teaches a quantity of soil mixture particles distributed throughout a body of spongy polymer. Moffet (U.S. Pat. No. 4,803,803) discloses a plant growth media "which comprises small tufts of mineral wool." Anton (U.S. Pat. No. 5,224,292) discloses a "non-woven mat comprising a layer of hollow synthetic organic fibers." Hsh (U.S. Pat. No. 5,363,593) discloses a synthetic cultivation medium comprised of scrap textile. Kosinski (U.S. Pat. No. 6,555,219) discloses "a soil substitute" comprised of "biodegradable and non-biodegradable polymer fibers."

All of these above-mentioned inventions provide a fibrous, filamentous or foam support for seed which allows water to pass through. While these disclosures offer an advantage over germinating seeds in soil alone, none of these references, taken alone or in combination offer the advantages of the present invention.

Seed germination is a particular concern in any soil-less cultivation system. Since the soil-less medium must adequately support the seed, the medium must be composed of a material firm enough to hold a seed, seedling or cutting in place until its root and stem structures can form, and yet it must contain characteristics of porosity and low water-retention so that seeds are not immersed in liquid.

A variety of soil-less, specifically seed-germinating media have been disclosed in the prior art. For example, Jones (U.S. Pat. No. 4,075,785) teaches a "discrete media of finite and substantially definite dimensions and having sufficient mechanical integrity and chemical stability to substantially withstand fracturing and degradation . . . as a seed implanted therein germinates and the resulting plant grows to commercial maturity." Jones describes one such embodiment of this "discrete media" comprising a "peat pellet encased in perforated plastic."

Dedolph (U.S. Pat. Nos. 4,221,749 and 4,495,310) teaches a "plant growth supporting rooting medium" comprised of polyurethane foam. This patent has been commercialized in the Chia® sponge and the Rapid Rooter® grow sponge, both of which permit seed germination within the sponge. Nir (U.S. Pat. No. 4,332,105) teaches an "aeroponic plant growth and development medium especially suitable for the development of seeds, seedling or cuttings . . . comprising a support member formed of generally coplanar spaced sheets of screen material." Alternatively, Nir teaches a "plurality of seed containing dishes" which are perforated to allow "its contents [to be] subjected to a mist." Fraze (U.S. Pat. No. 4,669,217) teaches "a self-containing nutrient plant propagation medium utiliz(ing) a sterile, low water retention, linear foam plastic" within which a seed may be placed for germination. This medium is placed into the "mounting surface" of a hydroponic system which contains holes sized for the medium. More recently, Ishioka (U.S. Pat. No. 5,934,011) teaches "a seedling culture mat comprising a mat which comprises a fibrous substrate or a water-soluble film or paper." Otake (U.S. Pat. No. 6,240,674) teaches a porous sheet of foamed cells for raising seedlings on an industrial mass-production scale.

Each of these seed germination media may be used to carry a seed until implantation of the entire seed-bearing medium in either a soil-based or soil-less plant growth system. None of these above described disclosures provides the seed support media of the present invention:

It is known that certain seed types germinate at a higher frequency with light and that others germinate at a higher frequency with darkness. This invention provides germination caps for directing light toward or away from seeds for various germination requirements. Although U.S. Pat. No. 4,198,783 (issued Apr. 22, 1980) describes frosted, convex light absorbing elements to intercept and direct light to plants, the elements do not direct light toward germinating seeds or away from plants or seeds. Also, the shapes of the elements appear to be convex in outer shape to prevent external liquid from being contained, by the element, but the elements do not include optical elements for directing light.

SUMMARY OF THE INVENTION

This invention provides a system for providing liquid to a plant or a seed that can germinate into a plant, said system comprising: a liquid delivery device; an actuator; a vessel; and a vessel support; wherein said actuator is operable to cause said liquid delivery device to deliver said liquid to said plant or seed only when said vessel is brought into proximity with said vessel support.

In an embodiment, the liquid delivery device comprises a pump. In an embodiment, bringing into proximity is directly contacting said vessel support with said vessel. In an embodiment, into proximity is setting said vessel on said vessel support. In an embodiment, the actuator causes said liquid delivery device to deliver said liquid by providing energy to said liquid delivery device. In an embodiment, the activator is a switch.

In an embodiment, the actuator comprises a first component and a second component. In an embodiment, the first component is in direct contact with said vessel and said second component is in direct contact with said support. In an embodiment, the first component and/or said second component is a characteristic selected from the group consisting of: elastic, springing, reversibly bendable, and bendably biased outwards. In an embodiment, the first component comprises gold-plated spring steel. In an embodiment, the second component comprises nickel-plated steel. In an embodiment, the actuator comprises a first component and second component and said vessel comprises said first component of said actuator and said vessel support comprises said second component of said actuator. In an embodiment, the vessel comprises said actuator or wherein said vessel support comprises said activator. In an embodiment, brought into proximity with comprises made an electrical connection with.

In an embodiment, liquid is not delivered to said plant or seed when said vessel is moved out of proximity with said vessel support. In an embodiment, the vessel also comprises a cover for suspending said plant or seed. In an embodiment, the liquid is aqueous and comprises plant nutrients.

This invention provides a method for providing liquid to a plant or a seed that can germinate into a plant, said method comprising: providing an the system of this invention; providing a plant or seed; providing a liquid; and delivering said liquid to said plant or seed using said system.

This invention provides a method for reversibly providing liquid to a plant or a seed that can germinate into a plant, said method comprising: providing an actuable device, said device comprising: a liquid delivery device; an actuator; a vessel; and a vessel support; wherein said actuator is operable to cause said liquid delivery device to deliver said liquid to said plant or seed only when said vessel is brought into proximity with said vessel support; providing a plant or seed; providing a liquid; and using said actuable device to deliver said liquid to said plant or seed. In an embodiment, method further comprises reversibly moving said vessel into proximity with said vessel support.

BRIEF DESCRIPTION OF THE DRAWINGS

FIG. 6A is an illustration showing a top view of a vessel, including the vessel cover, of a system of this invention. FIG. 6B is a perspective view. The curve form in the back of the vessel that allows for a smooth fit with the vessel support arm is visible.

FIGS. 7A and 7B are illustrations showing back and front views of a vessel of a system of this invention.

FIG. 10B is a close up of FIG. 10.

FIG. 11A is an illustration of an upper perspective view of a component of the actuator of the vessel. FIG. 11B is a lower perspective view.

DETAILED DESCRIPTION OF THE INVENTION

Figure 1:
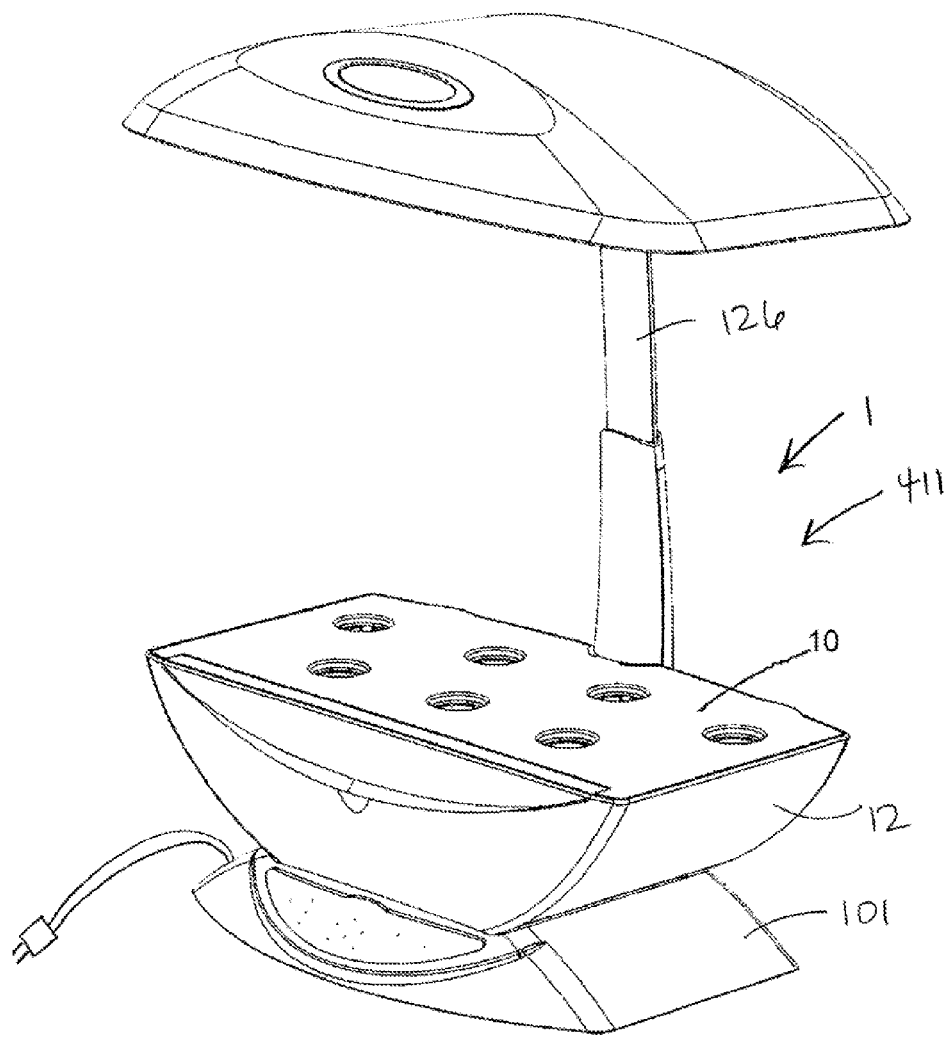
FIG. 1 is an illustration showing a perspective view of a gardening device comprising a system for providing liquid to a plant or seed.
Figure 2:
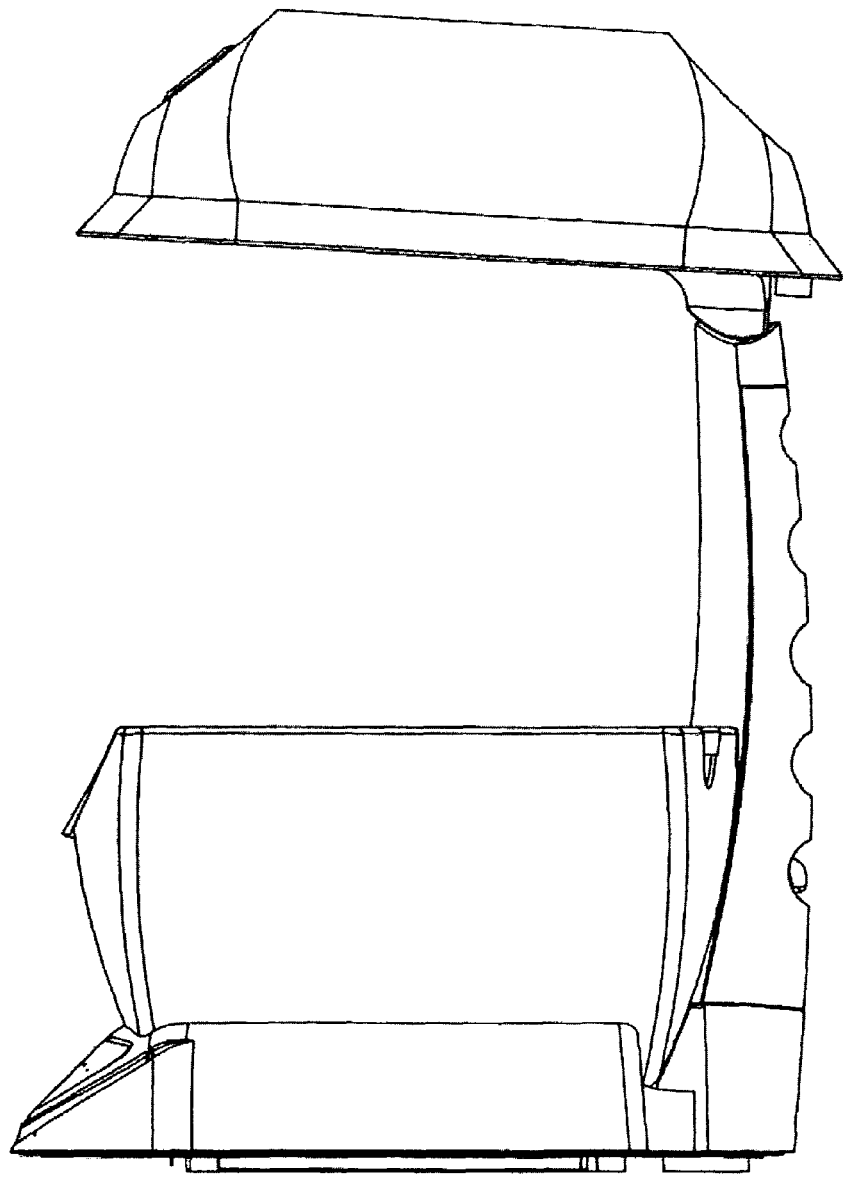
FIG. 2 is an illustration showing a left side view of the gardening device of FIG. 1.
Figure 3:
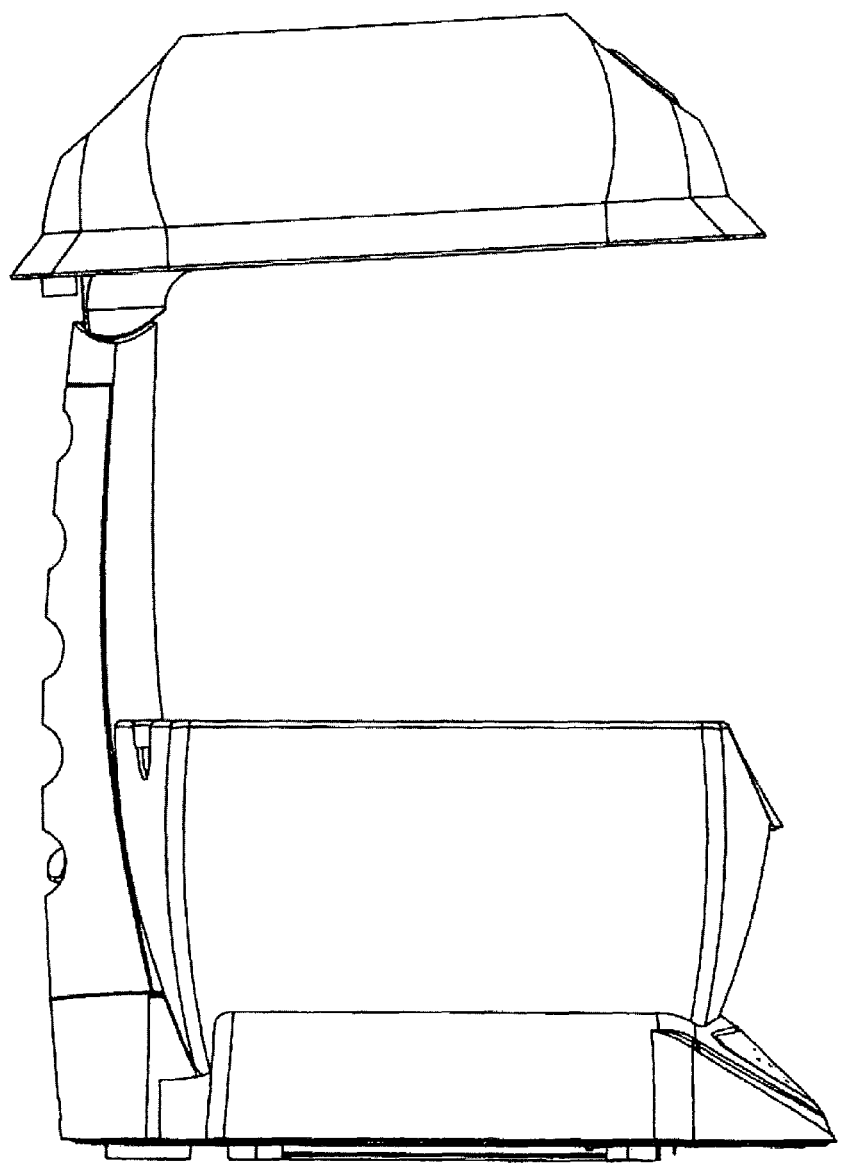
FIG. 3 is an illustration showing a right side view of the gardening device of FIG. 1.
Figure 4:
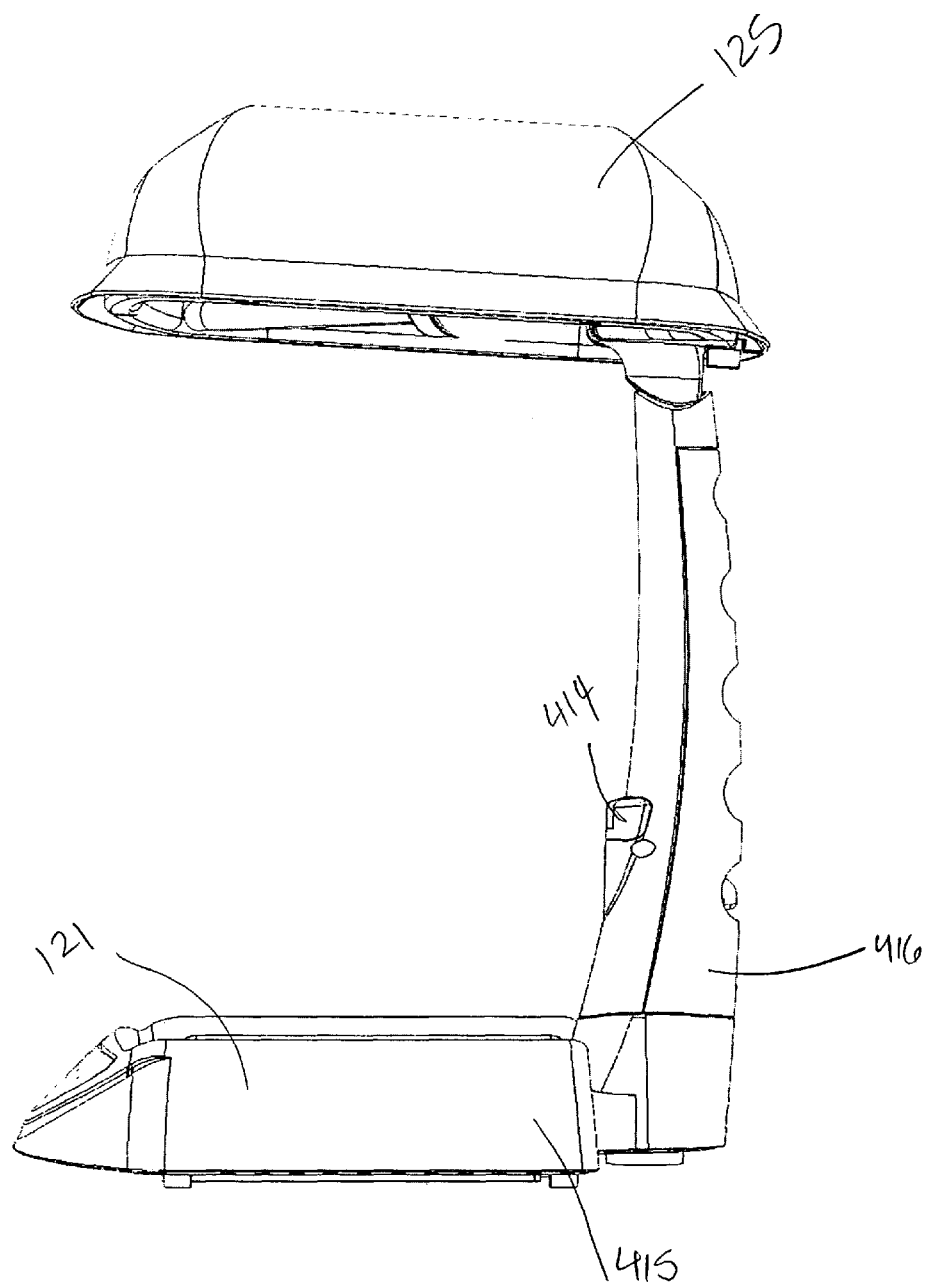
FIG. 4 is an illustration showing a left side view of the vessel support base, arm, and photoradiation apparatus of a system of this invention.
Figure 5:
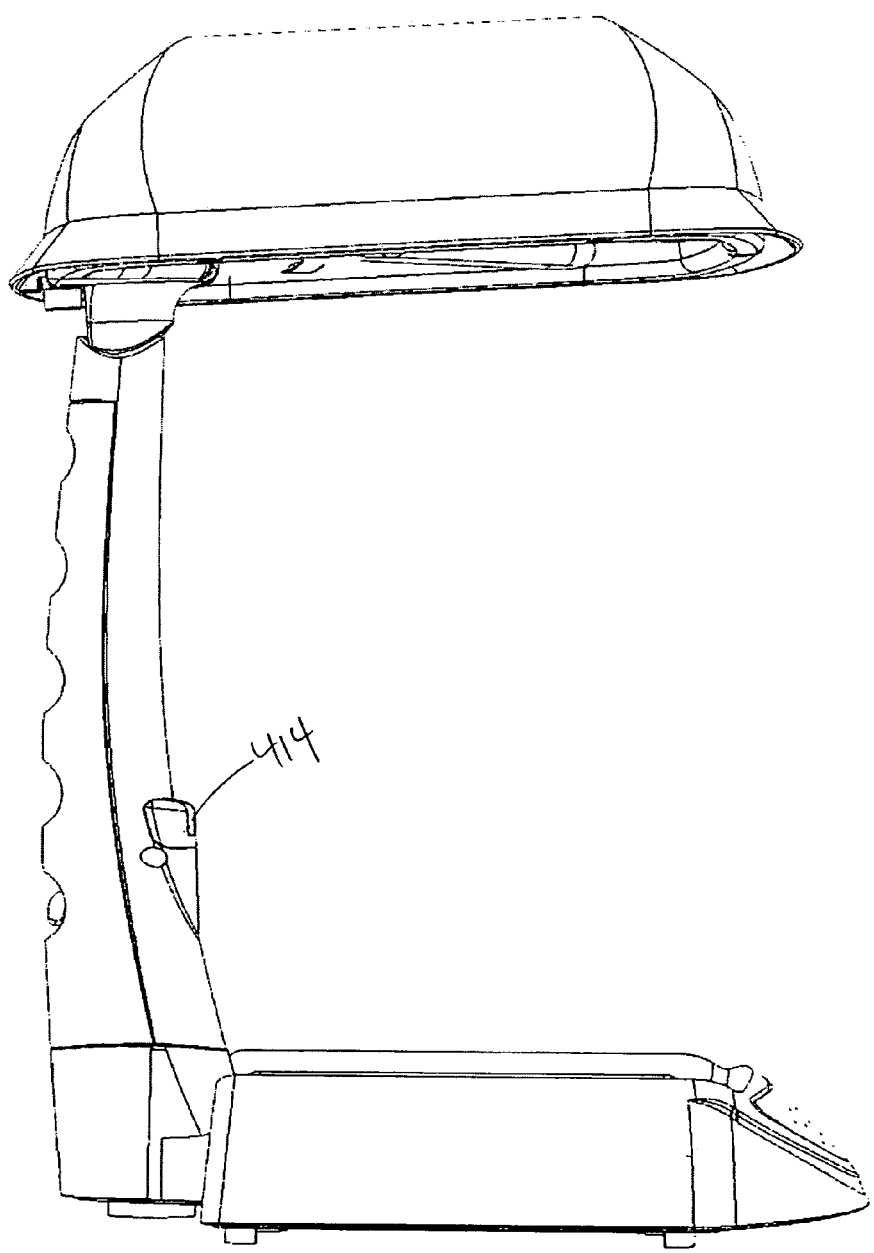
FIG. 5 is an illustration showing a right side view of the components shown in FIG. 4.
Figure 8:
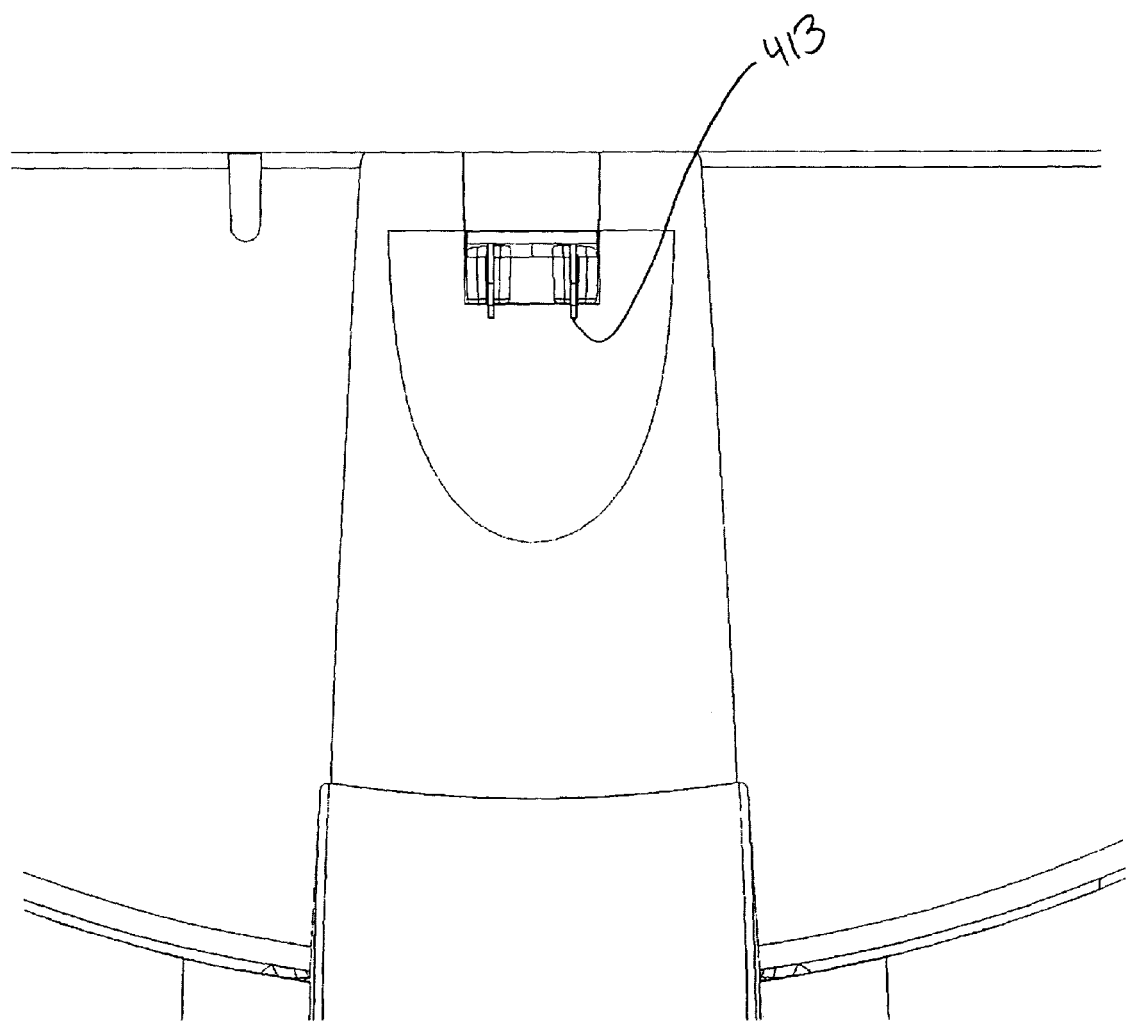
FIG. 8 is an illustration of a back view showing a close up of some of the actuator components of the vessel.
Figure 9:
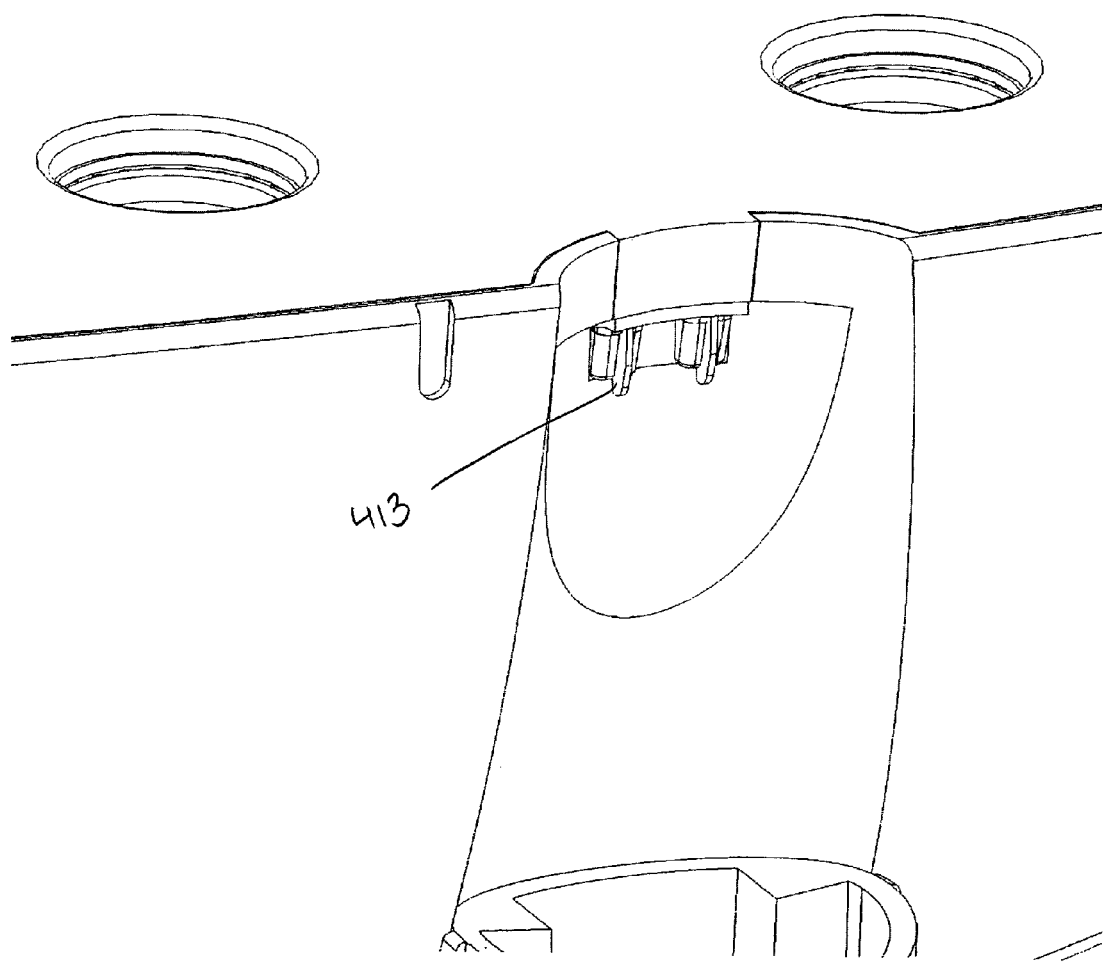
FIG. 9 is an illustration of a perspective view showing a close up as in FIG. 8.
Figure 10:
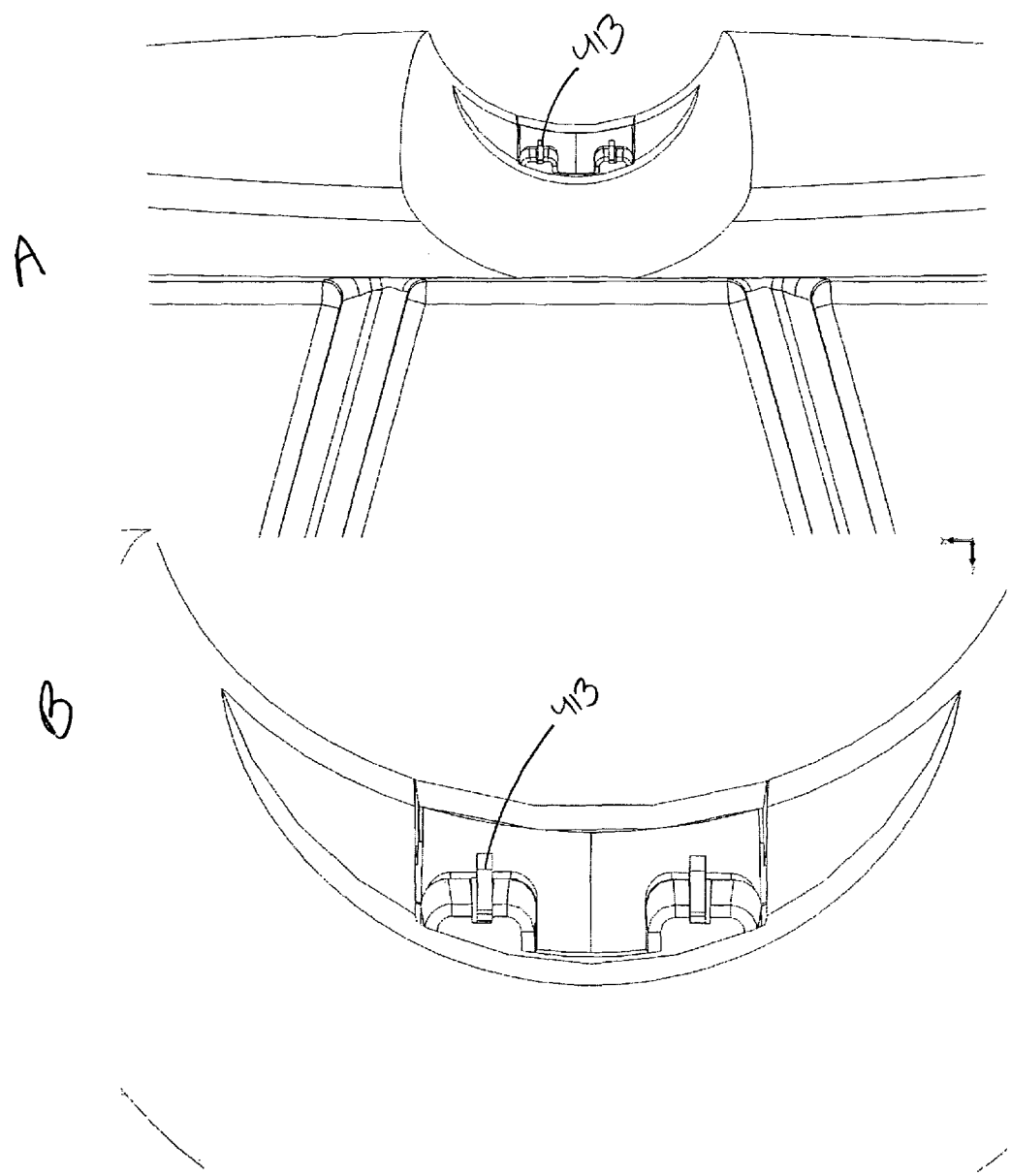
FIG. 10 is an illustration of a bottom view of the vessel in FIG. 8.
Figure 12:
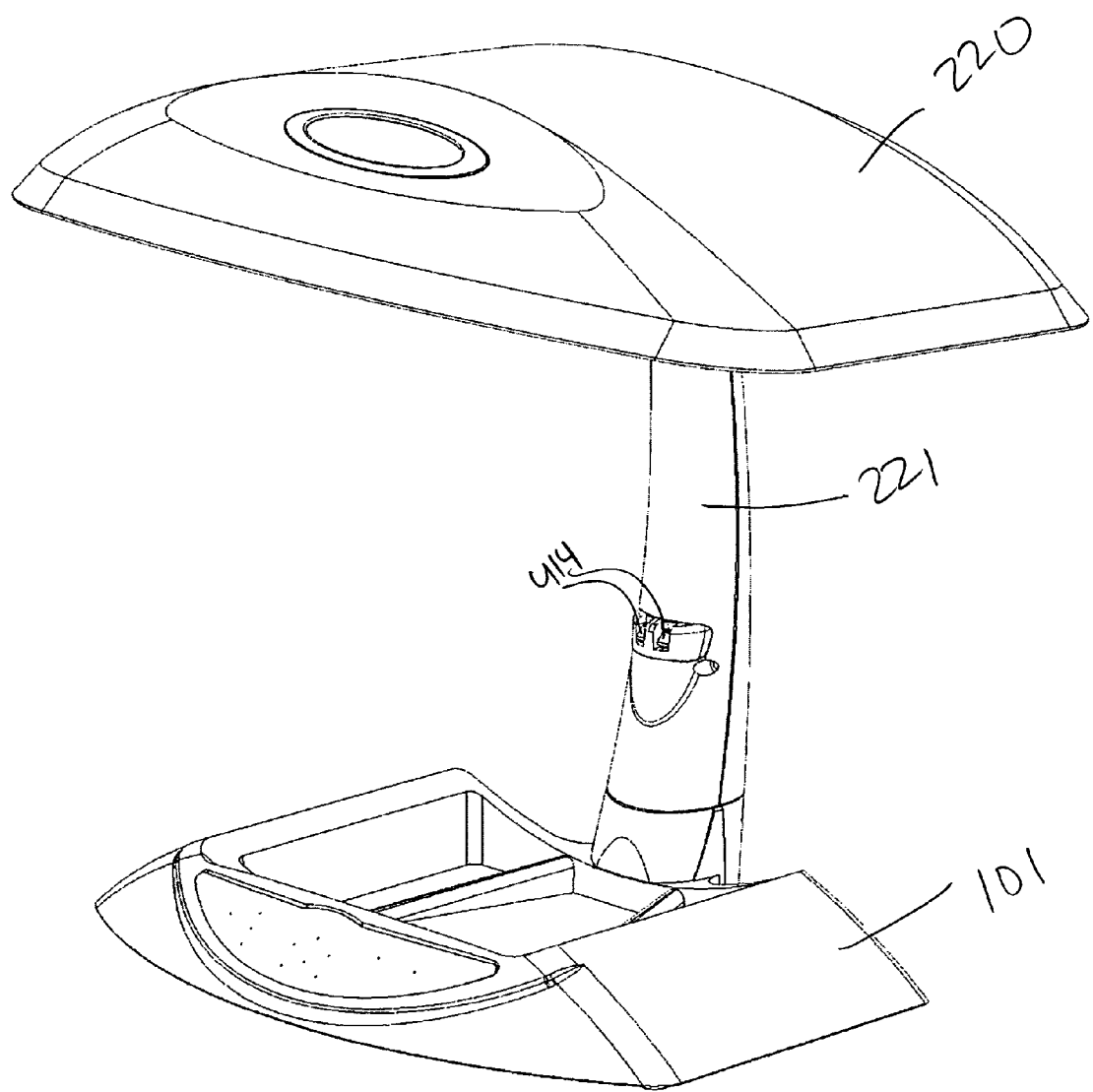
FIG. 12 is an illustration of an upper perspective view of a vessel support base and a vessel support arm of a system of this invention, attached to a photoradiation apparatus.
Figure 13:
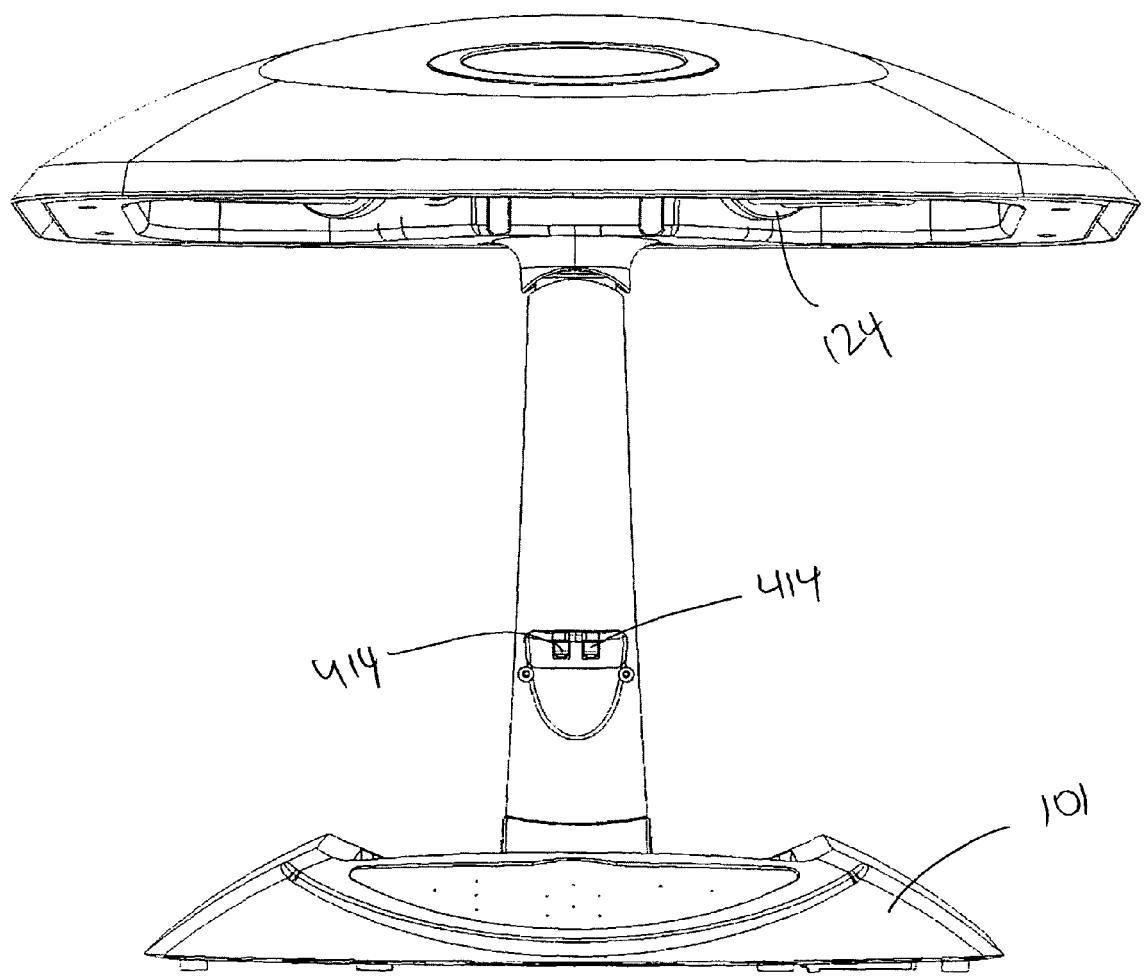
FIG. 13 is a front view of FIG. 12.
Figure 14:
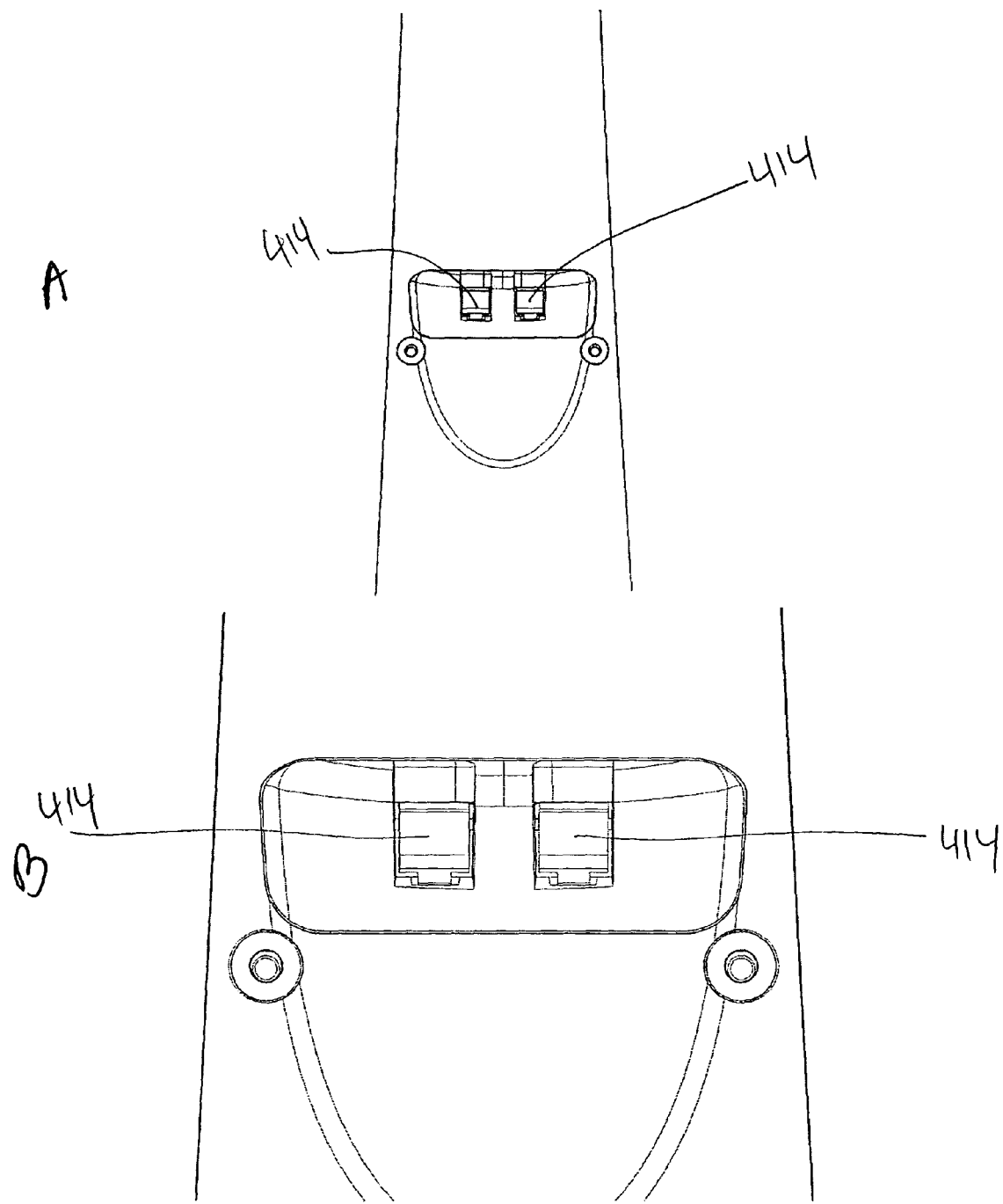
FIG. 14A is a close up of the actuator components of the vessel support.
FIG. 14B is even closer.
Figure 15:
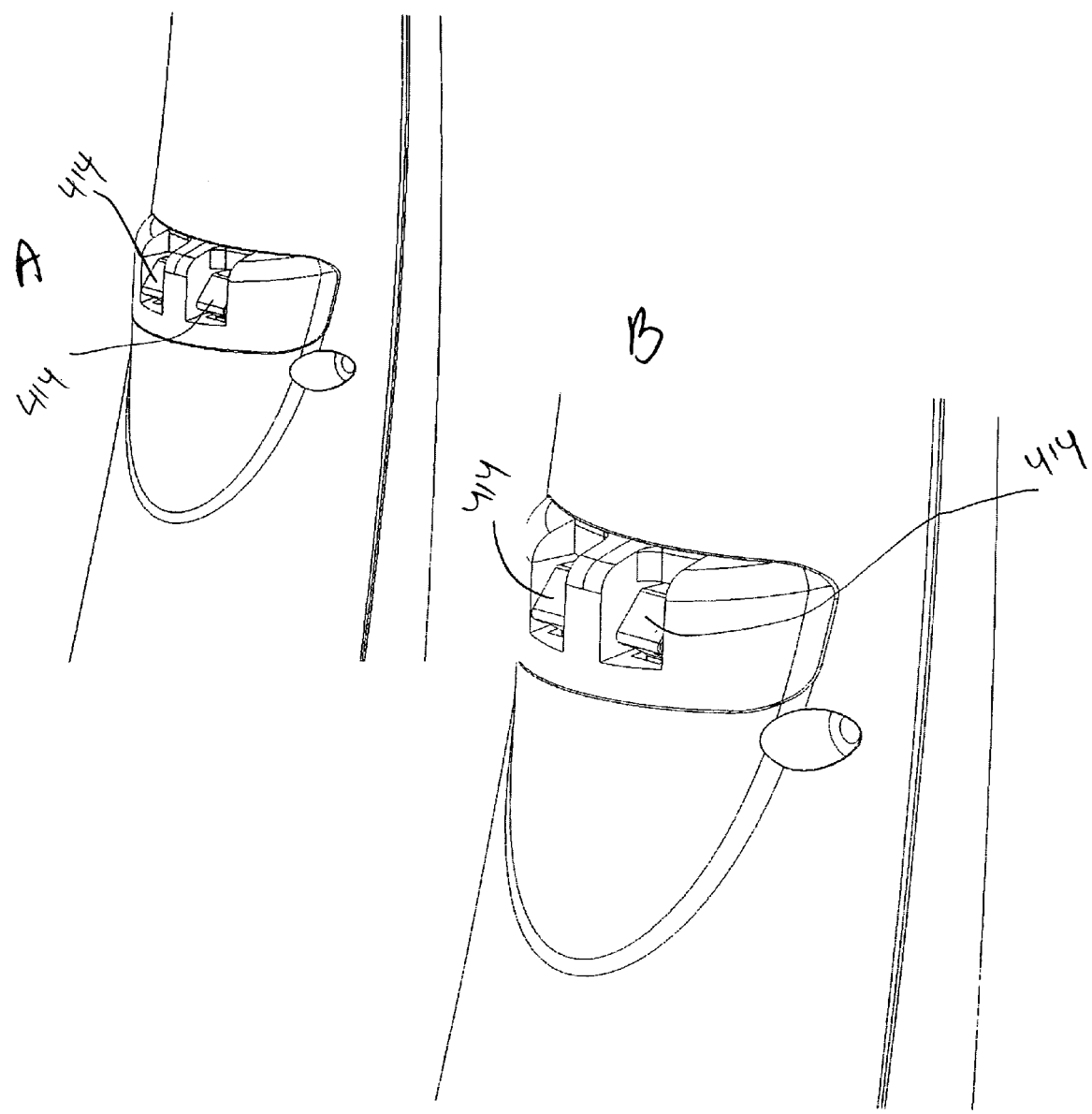
FIG. 15A is an illustration of a perspective view of the actuator components of a vessel support of this invention.
FIG. 15B is a close up. The gold-plated spring steel components are labeled.
Figure 16:
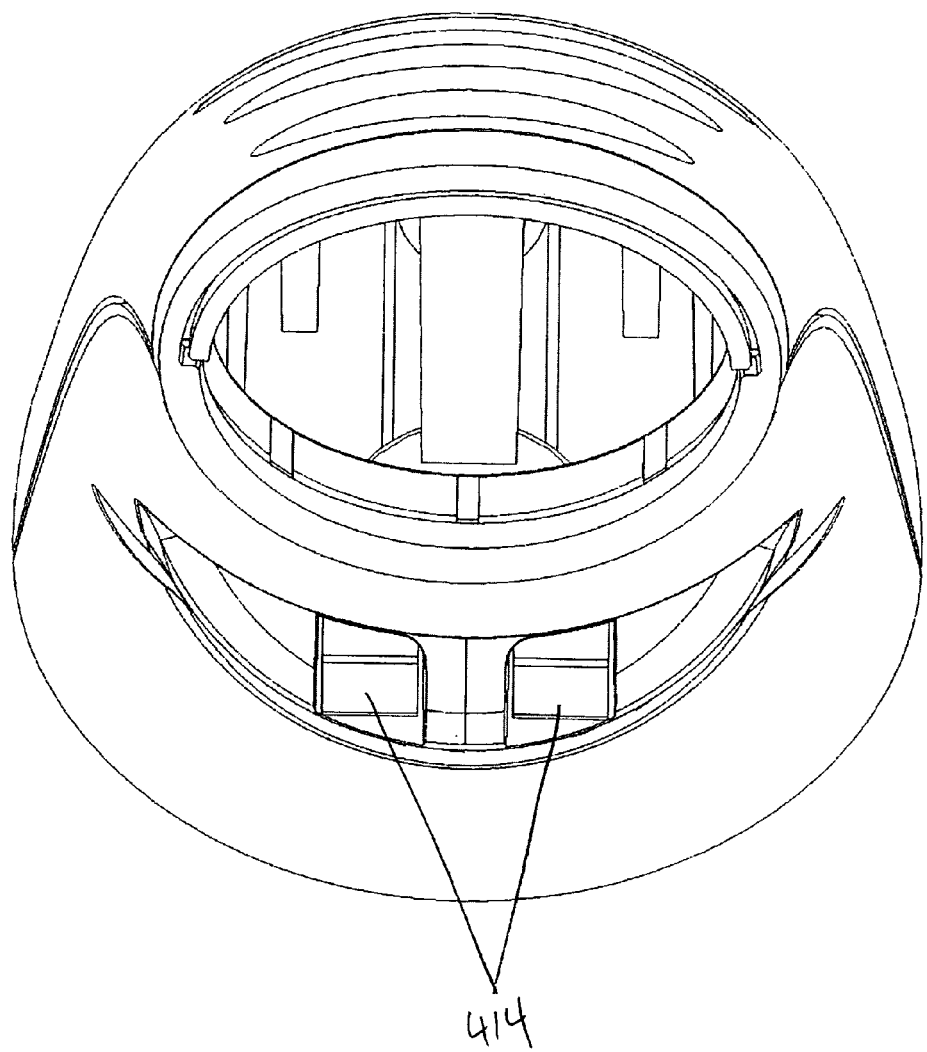
FIG. 16 is an illustration of a top view of a vessel support arm component of a system of this invention.
Figure 17:
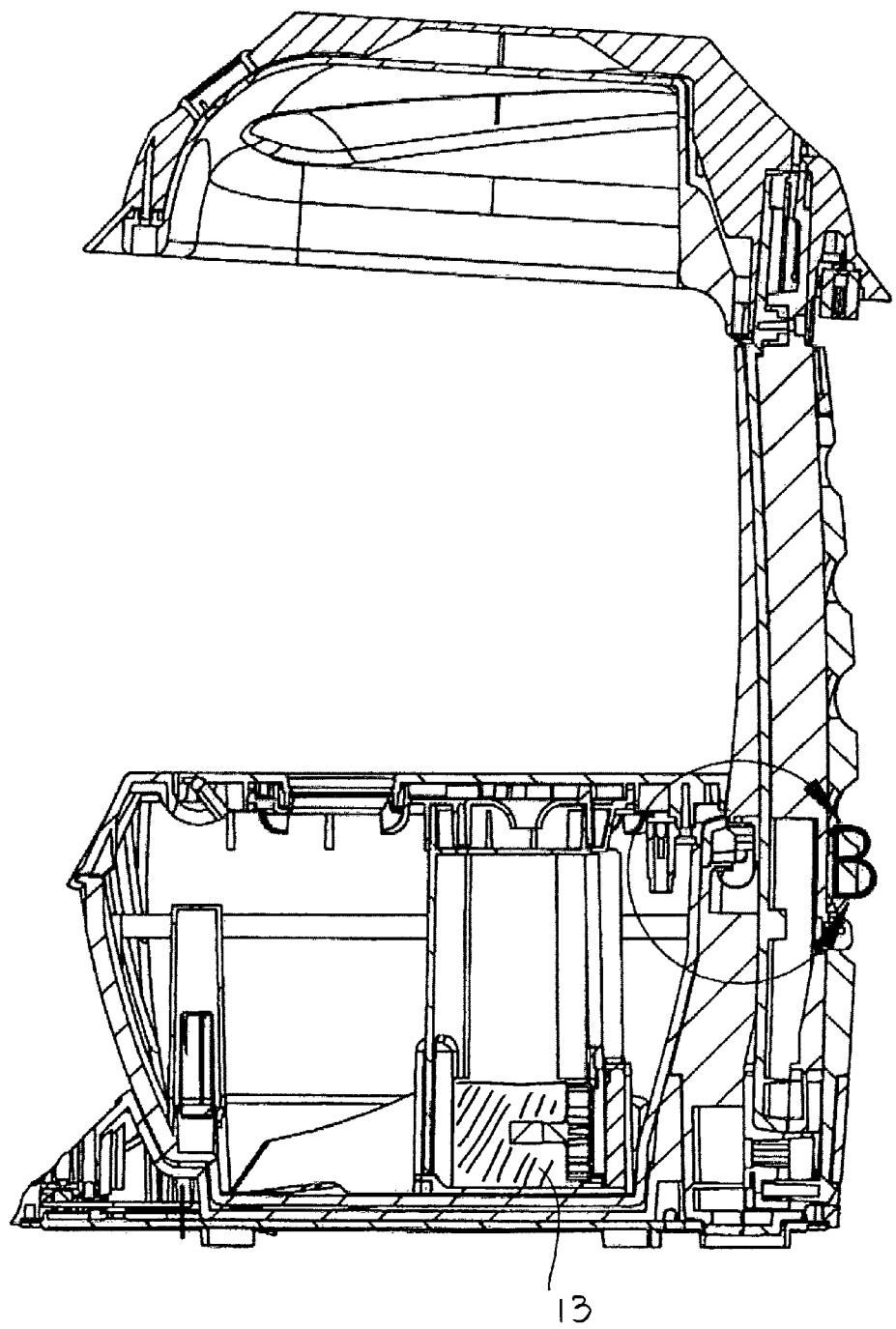
FIG. 17 is an illustration of a cross-section of a gardening device comprising a liquid delivery system of this invention, wherein the vessel and vessel support.
Figure 18:
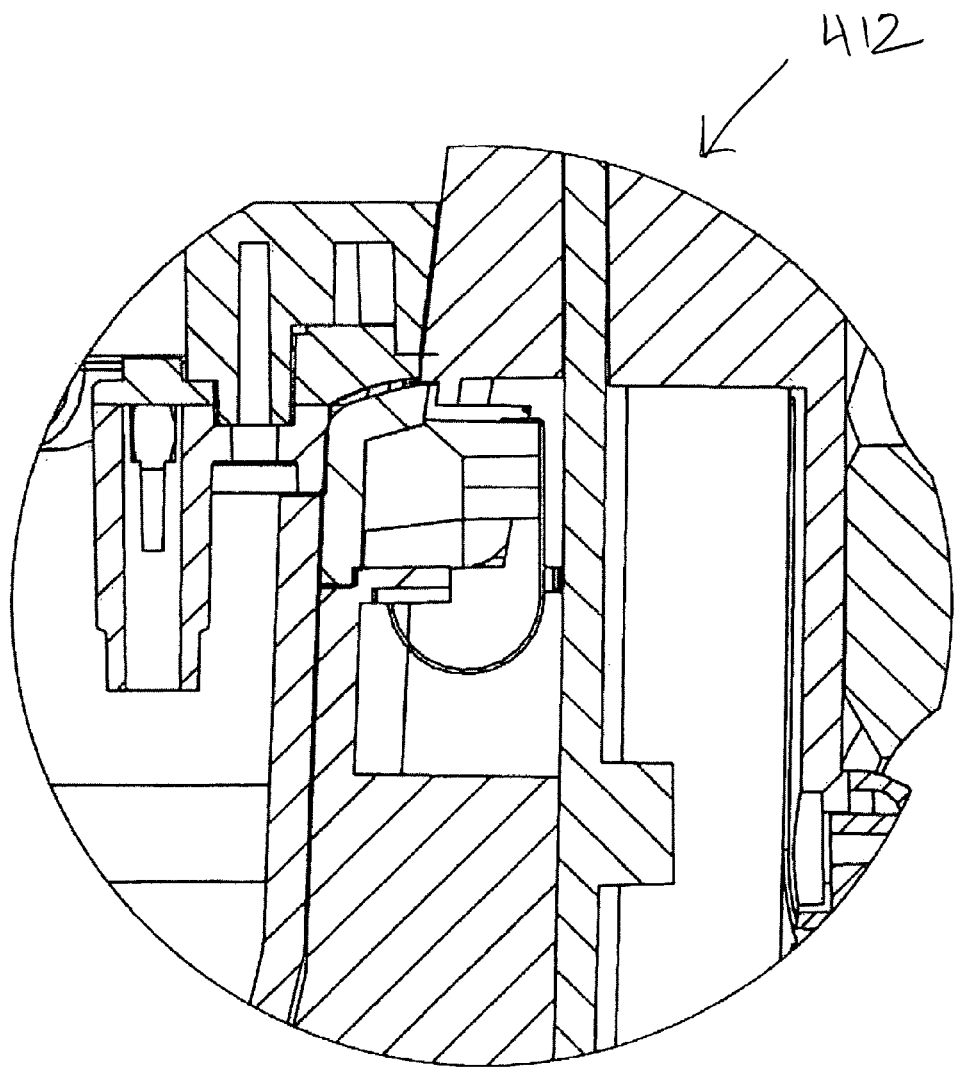
FIG. 18 is a close-up of some of the actuator components.
Figure 19:
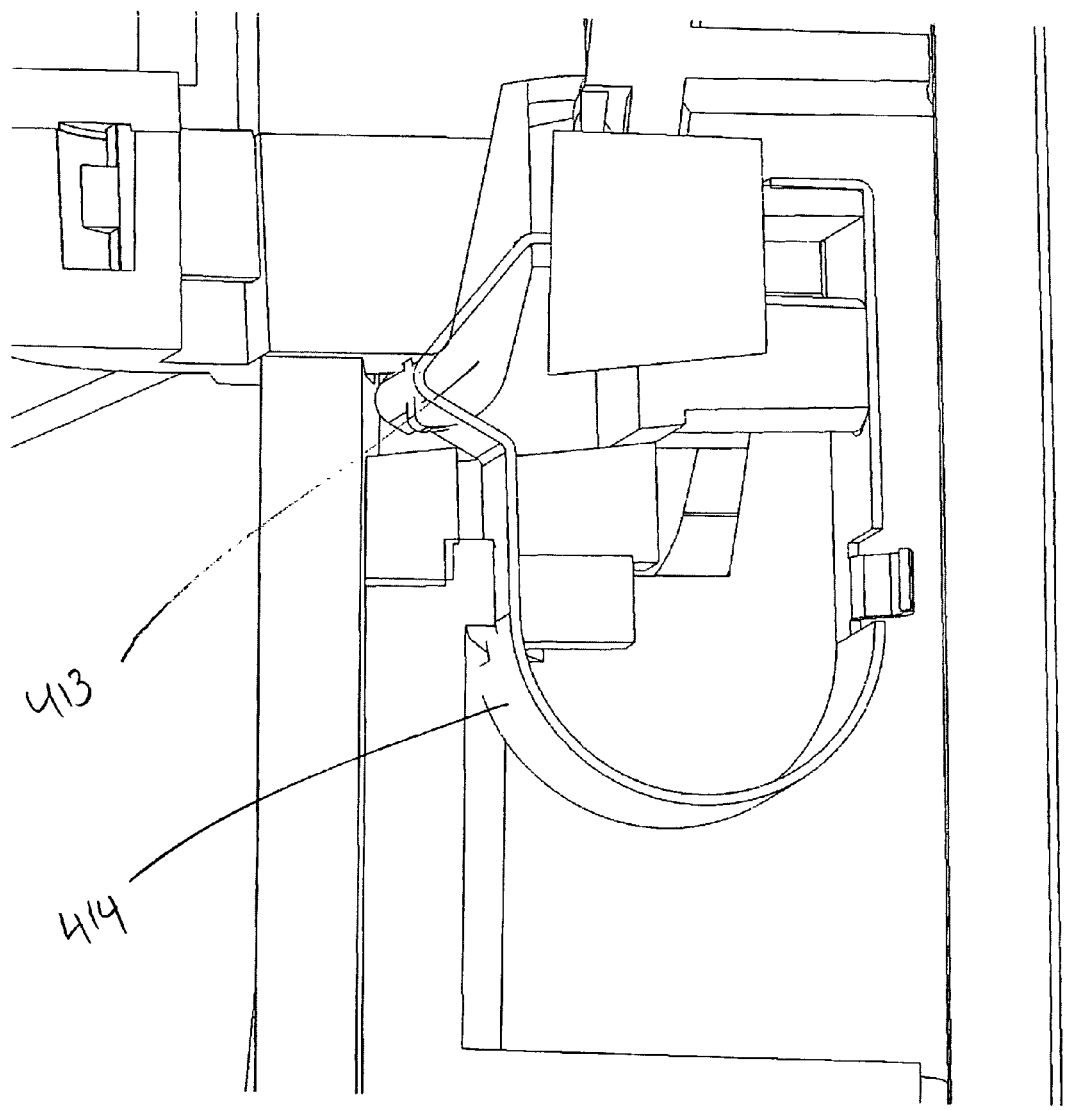
FIG. 19 is an illustration of a lower perspective view of juxtaposed vessel, vessel support, and actuator components, juxtaposed virtually, but not actually physically engaged/contacted or sufficiently brought into proximity, of a liquid delivery system of this invention.
Figure 20:
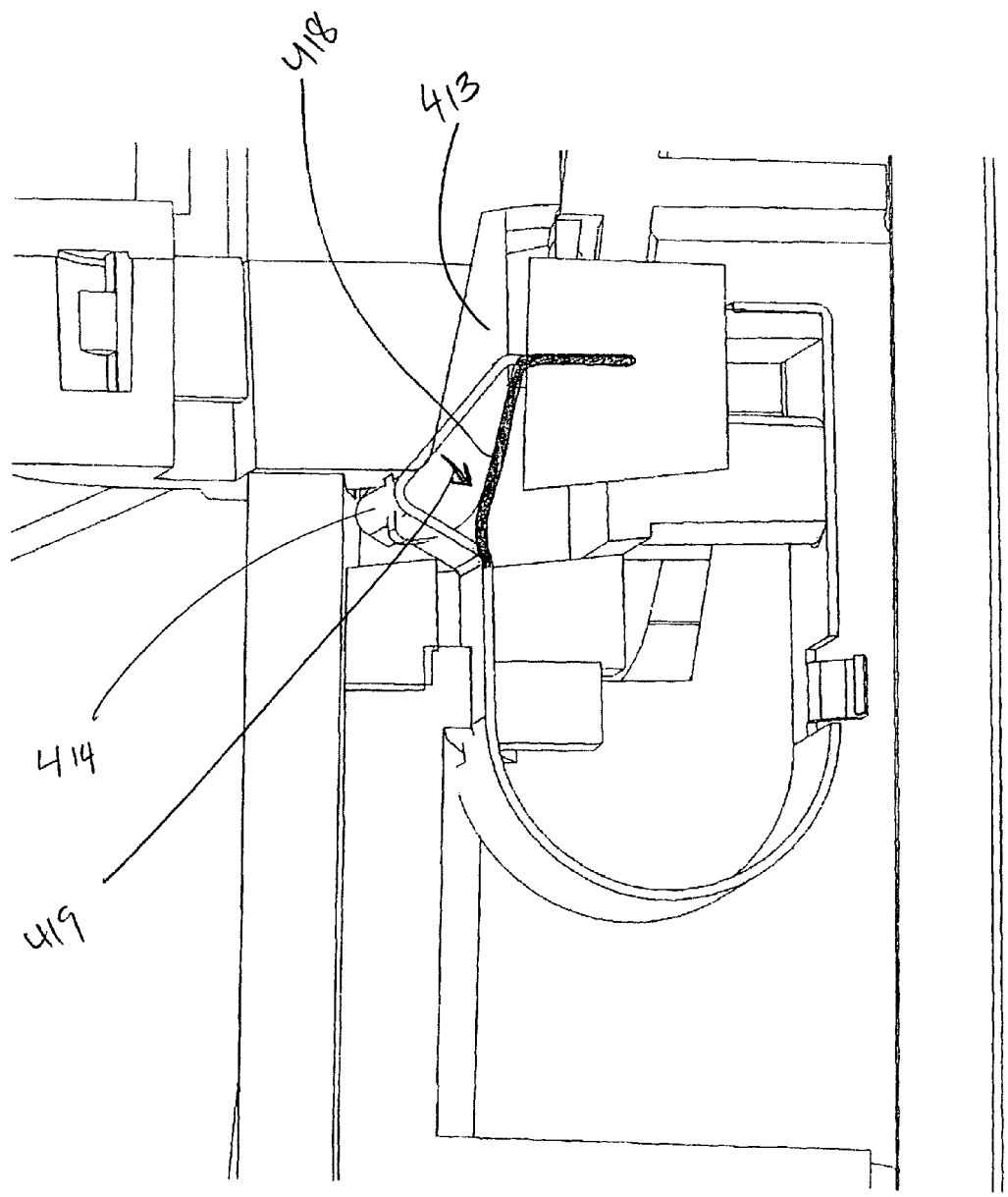
FIG. 20 is an illustration of the system in FIG. 19 wherein the actuator component is moved into position, as it would be in a real physically engaged/contacted or sufficiently brought into proximity.
Figure 21:
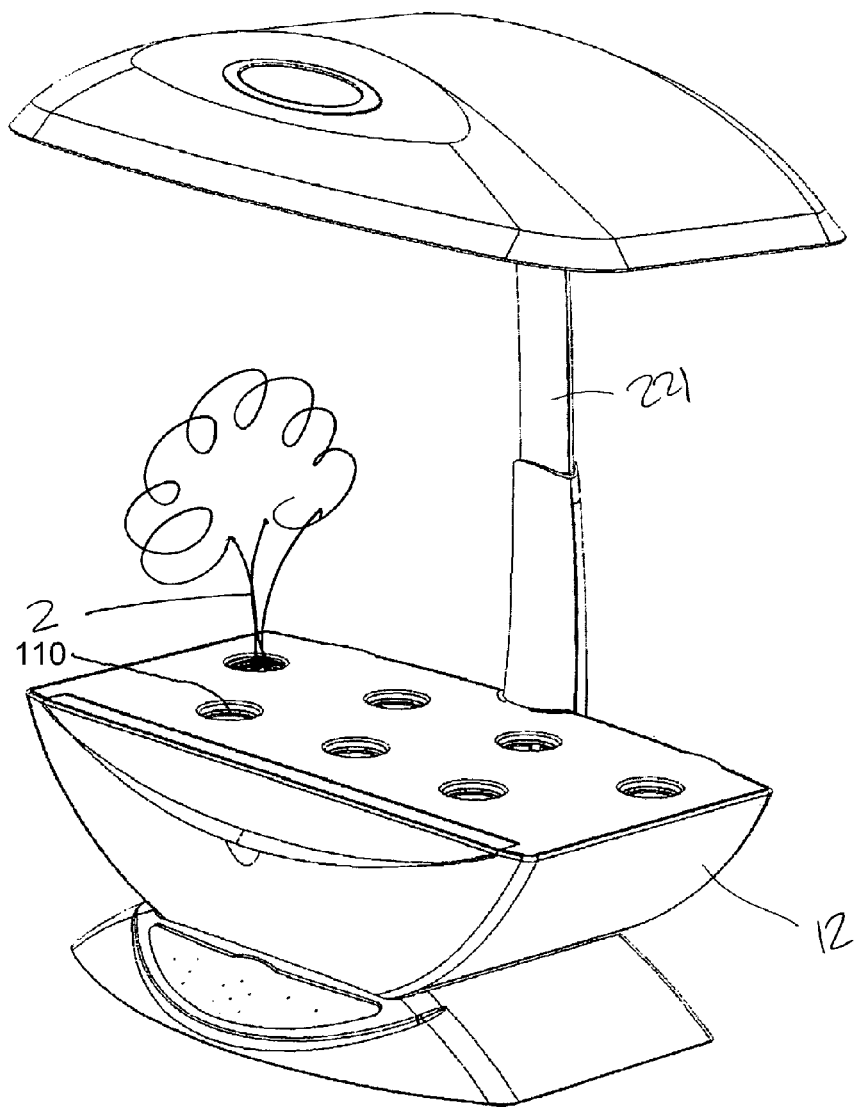
FIG. 21 is an illustration of a gardening device comprising a liquid delivery device of this invention with a plant.

As is used in the art and as used herein, a "vessel" is able to contain a liquid and optionally has a bottom wall and/or one or more side walls. The bottom wall can have vertical as well as horizontal components as in a hemisphere. A side wall has a vertical component. Preferably the vessel is not permeable to photoradiation that would interfere with plant growth or would promote growth of unwanted organisms such as algae.

As used herein, "hydroponic" refers to plant growing techniques that do not use soil.

As used in the art and as used herein, "nutrients" refers to atoms and molecules in an available form necessary for plant growth in addition to oxygen, hydrogen, and water including calcium, magnesium, sodium, potassium, nitrogen, phosphorus, sulfur, chlorine, iron, manganese, copper, zinc, boron, and molybdenum. Nutrient formulations and recipes are known in the art (see, for example, Resh H. M (2001) Hydroponic Food Production, Sixth Addition, Woodbridge Press Publishing Company, Santa Barbara, Calif., USA). It is known in the art that a liquid that contacts a plant, e.g., liquid used to supply nutrients to a plant, is preferably within a particular pH range. Optimal pH ranges for a variety of plants are known in the art. As used herein, "photoradiation" refers to wavelengths of light of sufficient quantity and quality that allow a plant to grow, as is known in the art. It is known in the art which quantities and wavelengths of photoradiation are preferred for many plants.

The term "growing a plant" as used in herein refers to the process which takes place when appropriate conditions such as water, photoradiation, gas containing oxygen and carbon dioxide, and nutrients are provided to a plant tissue, whether a seed, a cutting, transplant, bulb, tuber, runner, or a plant having roots, resulting in an increase in the mass of plant tissue. The term "cutting" as used herein refers to plant tissue with or without roots taken from an already existing plant.

The term "germinating a seed into a plant" as used herein refers to the process which takers place when appropriate conditions such as water, photoradiation, gas containing oxygen and carbon dioxide are provided to the seed, resulting in the emergence of a plant embryo from the seed.

The term "intermittent delivering" as used herein refers to a delivery schedule which includes periods of time when delivery is not taking place. The term "continuous delivering" as used herein refers to a delivery schedule which does not include a period of time when delivery is not taking place.

As used herein, the term "enclosed" refers to the state of having substantially all of the surfaces of a vessel defined by a solid object.

used herein, "photoradiation includes direct, indirect, reflected, and refracted photoradiation. As used herein, the term "natural or artificial photoradiation source" refers to any source of photoradiation, including the sun, bulbs, and reflective surfaces.

As used herein, the term "liquid nutrient solution" refers to a liquid which contains nutrients in solution or suspension or in a mixture, or in a combination of solution, suspension or mixture. As used herein, the term "nutrient concentration" refers to the concentration of nutrient in the liquid within the device including that which is available for delivery to plant tissue.

The components illustrated in the drawings are numbered as shown below.

Drawing Elements

| Item | Number |
|---|---|
| 1 | plant growing device |
| 2 | plant |
| 10 | vessel cover |
| 11 | liquid |
| 12 | vessel |
| 13 | pump |
| 101 | base/vessel support |
| 108 | indentation for photoradiation arm |
| 110 | seed |
| 121 | means for receiving vessel |
| 220 | artificial photoradiation hood |
| 221 | adjustable photoradiation arm |
| 223 | means for adjusting photoradiation hood height |

Drawing Elements -continued

| Item | Number |
|---|---|
| 124 | photoradiation source |
| 125 | photoradiation apparatus |
| 126 | extended arm |
| 210 | liquid delivery device |
| 411 | system for providing liquid to plant or seed |
| 412 | actuator components |
| 413 | first actuator component |
| 414 | second actuator component |
| 415 | vessel support base component |
| 416 | vessel support arm component |
| 417 | curves for vessel/vessel support fit |
| 418 | actuator element moved into activated/actuated position |
| 419 | arrow showing spring actuator element moving into engagement/actuation |

The items marked in the figures are labeled in the table above.

This invention provides a system for providing liquid to a plant or a seed that can germinate into a plant, said system comprising: a liquid delivery device; an actuator; a vessel; and a vessel support; wherein said actuator is operable to cause said liquid delivery device to deliver said liquid to said plant or seed only when said vessel is brought into proximity with said vessel support.

In an embodiment, the liquid delivery device comprises a pump. In an embodiment, bringing into proximity is directly contacting said vessel support with said vessel. In an embodiment, into proximity is setting said vessel on said vessel support. In an embodiment, the actuator causes said liquid delivery device to deliver said liquid by providing energy to said liquid delivery device. In an embodiment, the activator is a switch.

In an embodiment, the actuator comprises a first component and a second component. In an embodiment, the first component is in direct contact with said vessel and said second component is in direct contact with said support. In an embodiment, the first component and/or said second component is a characteristic selected from the group consisting of: elastic, springing, reversibly bendable, and bendably biased outwards. In an embodiment, the first component comprises gold-plated spring steel. In an embodiment, the second component comprises nickel-plated steel. In an embodiment, the actuator comprises a first component and second component and said vessel comprises said first component of said actuator and said vessel support comprises said second component of said actuator. In an embodiment, the vessel comprises said actuator or wherein said vessel support comprises said activator. In an embodiment, brought into proximity with comprises made an electrical connection with.

In an embodiment, liquid is not delivered to said plant or seed when said vessel is moved out of proximity with said vessel support. In an embodiment, the vessel also comprises a cover for suspending said plant or seed. In an embodiment, the liquid is aqueous and comprises plant nutrients.

This invention provides a method for providing liquid to a plant or a seed that can germinate into a plant, said method comprising: providing an the system of this invention; providing a plant or seed; providing a liquid; and delivering said liquid to said plant or seed using said system. This invention provides a method for reversibly providing liquid to a plant or a seed that can germinate into a plant, said method comprising: providing an actuable device, said device comprising: a liquid delivery device; an actuator; a vessel; and a vessel support; wherein said actuator is operable to cause said liquid delivery device to deliver said liquid to said plant or seed only when said vessel is brought into proximity with said vessel support; providing a plant or seed; providing a liquid; and using said actuable device to deliver said liquid to said plant or seed. In an embodiment, method further comprises reversibly moving said vessel into proximity with said vessel support.

The methods and devices of this invention are useful for growing more than one plant. When more than one plant is grown, the device optionally includes a means for delivering and the method optionally includes delivering the second portion of liquid to each plant separately.

This invention provides kits for growing a plant or germinating a seed into a plant comprising: a system of this invention and instructions for using the system.

In an embodiment of this invention, the walls of the vessel are not permeable to photoradiation and the suspending means removably covers the vessel. In an embodiment of this invention, the vessel and cover prevent unnecessary evaporation of water and entry of photoradiation and unwanted organisms. Some evaporation is desirable, as is known in the art (Christopher Hall and William D Hoff, (May 1, 2001) Water Transport in Brick, Stone and Concrete, Routledge mot E F & N Spon; $1^{st}$ edition) to assist in wicking the liquid up to the plant and to oxygenate the liquid as it is wicking. The suspending means is able to hold one or more plants. The plants are suspended by any means known in the art including by suspending a plant support such as a frictionally engaged sponge in the opening by friction or by a hanging basket that is filled with soil or other growth medium. Alternatively, the plants can be propped up by a portion of the vessel. In an embodiment of this invention, the vessel and cover are made of an opaque, light-colored plastic (e.g., acrylonitrile butadiene styrene, Magnum™, Dow Chemical, Pevely, Mo., U.S.A.) that is impermeable to water, not permeable to photoradiation, and that absorbs little photoradiation. In an embodiment of this invention, the device is an enclosed chamber except for plant openings, which are large enough to allow for radial growth of the stem of each plant.

The methods and devices provided by this invention are useful with and without soil. The methods are easy to follow and the devices are easy to use. Most plants, including universally believed to be difficult growers such as orchids can be grown in the devices of this invention. The devices of this invention form enclosed chambers for root nourishment and growth. The devices are self-contained and provide water, photoradiation, and plant nutrients with little care and maintenance by a user. Optionally means are provided for alerting a user to add water, liquid, and/or plant nutrients. The devices optionally include photoradiation sources, and a means for regulating the frequency and duration of photoradiation delivery.

The devices of this invention are useful for growing plants from seed through harvest and through senescence or death. The devices of this invention are useful for growing transplants, cuttings, somatic embryos, tubers, and runners.

In an embodiment of this invention, the devices are made by injection molding ABS. The hydroponics device of this invention can be made from any material that is firm enough to hold liquid. The material used to make the cover and vessel are preferably sufficiently impermeable to photoradiation to prevent photoradiation from entering inside. The material for enclosing the water level gauge is preferably permeable to photoradiation, allowing the gauge to be visible. The materials that contact the plants or the liquid should not substantially reduce plant health or impede growth. Materials useful in the practice of this invention include, for example, glasses, plastics, and metals. Useful plastics include, for example, acrylonitrile butadiene styrene, polyethylene terepthalate glycol, polystyrene, polycarbonate, recycled, recyclable, photodegradable, and biodegradable plastics. Useful degradable plastics do not degrade during use of the device. Biodegradable plastic materials are particularly useful for terraced aerators and net baskets which may be transplanted with plants. Useful metals include: gold, copper, steel, stainless steel, nickel, plated metals, and other electrically conductive metals known in the art.

In an embodiment, the smart garden includes a means for communicating with an external programmable storage device directly and/or through the internet.

In an embodiment, the systems of this invention comprise additional means for regulating the delivery of liquid. In an embodiment, the system is enclosed. In an embodiment, a system and a device are interchangeable. In an embodiment, the liquid delivery device can be selected from devices useful for third components. In an embodiment, the vessel support has an upward facing angled surface portion that is similar to part of a surface of a cone and the vessel has a downward facing angled surface portion that complements the vessel support surface. In an embodiment, the electrically conductive material is one or a plurality of self-aligning pins. In an embodiment the vessel seats in the vessel support, with no effort on the part of a user, by gravity before the vessel contains liquid or after the vessel contains a minimal amount of liquid. In an embodiment, electrically conductive materials are plated to prevent rust from forming. In an embodiment, energy supplied to the vessel support is 120V AC but is stepped down to 12V AC before arriving at the actuator. In an embodiment, the 120V AC is stepped down by a transformer. In an embodiment, some of the 120V AC is shunted to a different device. In an embodiment, that device is a photoradiation producing device. In an embodiment, the only voltage through the actuator is at or below the limit at which electrically live components can be exposed or bare, with no substantial shock hazard, per Underwriter's Laboratories. In an embodiment, spring or elastic steel is used to increase the distance tolerance of components contacting each other. In an embodiment, the actuator comprises a blade type connector and a spring type connector.

In an embodiment, the actuator comprises a component with a spring-like capability. Spring-like capability can include: behaving like an elastic (electrically conductive in our case) mechanical device designed to absorb recoil or shock, to exert tension, or store up energy, and may possess the added characteristics of a supporting, guiding, or controlling member; generally manufactured from metal, but may, under certain use demands, be manufactured from a combination of metal and/or other elastic material.

In an embodiment, a gardening appliance comprises a system of this invention. In an embodiment,t he gardening appliance is in use in a room without a counter or sink. In an embodiment, the gardening appliance is used in a kitchen, and is on the counter next to the sink. Liquid is delivered to the plants growing in the appliance. In an embodiment, the vessel containing a liquid, liquid delivery device, and other components is lifted off of the vessel support, and the liquid is no longer delivered. Electricity is still delivered to the vessel support and is delivered to other appliance components, such as a photoradiation delivery device and a smart garden device. It is advantageous for the user to easily separate the low voltage components from the higher voltage components, and/or be able to move the water safe components to water while keeping the water unsafe components, such as light bulbs and smart garden away from water not contained by the vessel. The user moves the vessel, liquid, and plants to a counter or sink. The plants are easily and safely harvested near the food preparation area. The photoradiation hood, arm and other parts do not interfere with the ability of the user to easily get to the plants. Alternatively, the user could maintain or clean the vessel and/or plants in greater safety. The use is able to do this without unplugging the appliance, flipping on on/off switch, unlocking any devices, etc. only lifting the vessel off of the vessel support. In addition, because the appliance comes back on, liquid is able to be delivered, when the vessel is set back on the vessel support, there is no risk that the user will forget to turn the appliance back on. The smart garden and/or the hot light bulbs could be destroyed if they are contacted or submerged by water.

In an embodiment, the vessel and/or vessel support also comprises an insulation means. In an embodiment, the vessel and/or the vessel support comprises an electrically conductive material, for example metal, for example gold-plated spring steel or nickel-plated steel. This invention provides a gardening device for frictional electrical engagement comprising: a first object, comprising: a first electrically conductive material; a means for receiving electricity; means for delivering said electricity to said first electrically conductive material; and a means for frictionally engaging said first component with a second component; said second component comprising: a second electrically conductive material; a means for frictionally engaging with said first component; a third component that uses electricity; a means for delivering electricity from said second electrically conductive material to said third component; whereby when said first and second components are frictionally engaged, electricity flows from said first electrically conductive material to said second electrically conductive material. In an embodiment, the second component comprises a vessel for containing a liquid. In an embodiment, the first component comprises a base for supporting a vessel.

This invention provides a device for growing a plant or germinating a seed into a plant, said device comprising: a first component, comprising: a first electrically conductive material; a means for receiving electricity; means for delivering said electricity to said first electrically conductive material; and a means for frictionally engaging said first electrically conductive material with a second electrically conductive material; a second component comprising: said second electrically conductive material; a means for frictionally engaging said second electrically conductive material with said first electrically conductive material; a third component that can utilize electricity; and a means for delivering electricity from said second electrically conductive material to said third component; whereby when said first and second electrically conductive materials are reversibly frictionally engaged, electricity can flow from said first electrically conductive material to said second electrically conductive material.

In an embodiment, the device is for growing a plant or germinating a seed hydroponically. In an embodiment, the device is a hydroponics gardening device. In an embodiment, the second component is a vessel for containing a liquid. In an embodiment, the third component is selected from a group consisting of: liquid pumps, gas pumps, air pumps, aqueous pumps, light generating devices, aerators, stirrers, liquid delivery devices, liquid movement devices, mist generators, sonicating devices, and sprinklers.

In an embodiment, the third component is a device for delivering liquid to said plant or seed. In an embodiment, the first component is positioned underneath and/or next to said second component when said first and second electrically conductive components are engaged. In an embodiment, the first component comprises a means for supporting said second component. In an embodiment, the first component comprises a means for maintaining said second component in a fixed position by the force of gravity. In an embodiment, the first component comprises a means for supporting said second component. In an embodiment, the first component comprises a means for supporting a photoradiation delivery means to said plant or seed. In an embodiment, the first and second electrically conductive materials comprise metal. In an embodiment, the metal is selected from the group consisting of: gold, steel, nickel, gold-plated steel, nickel-plated steel, spring steel, brass, copper, and stainless steel. In an embodiment, the first electrically conductive material is gold-plated spring steel and said second electrically conductive material is nickel-plated steel.

In an embodiment, the first and second components comprise a non-electrically conductive material or an insulation means. In an embodiment, the non-electrically conductive material is ABS plastic. In an embodiment, the first electrically conductive material is elastic or comprises an elastic means. In an embodiment, the first and/or second electrically conductive material is a spring or comprises a springing means. In an embodiment, the first and/or second electrically conductive material is bent metal with a bias outwards. In an embodiment, the first and/or second electrically conductive material is blade-shaped and non-elastic.

In an embodiment, the means for frictionally engaging said first electrically conductive material with said second electrically conductive material is a means for urging said first electrically conductive material against said second electrically conductive material. In an embodiment, the first component comprises a means for urging said first component against said second component. In an embodiment, the first component comprises a form such that when said second component is set upon said first component, said second component fits into a position of first and second electrically conductive material engagement. In an embodiment, the first and/or said second component also comprises a means for maintaining engagement of said first and second electrically conductive materials. In an embodiment, the second component can be set upon said first component from above. In an embodiment, when the force of gravity acting upon said second component and the form of said first component interacting with the form of said second component engage said first and second electrically conductive materials and maintain said engagement. In an embodiment, the lifting said second component disengages said engagement.

This invention provides a device for growing a plant or germinating a seed into a plant, said device comprising: a vessel support comprising: a first electrically conductive material; a means for receiving electricity; means for delivering said electricity to said first electrically conductive material; and a means for frictionally engaging said first electrically conductive material with a second electrically conductive material; a vessel comprising: said second electrically conductive material; a means for frictionally engaging said second electrically conductive material with said first electrically conductive material; a third component that can utilize electricity; and a means for delivering electricity from said second electrically conductive material to said third component; whereby when said vessel is place upon said vessel support, said first and second electrically conductive materials are reversibly frictionally engaged and electricity can flow from said first electrically conductive material to said second electrically conductive material. In an embodiment, the vessel also comprises a means for containing a liquid. In an embodiment, the vessel also comprises a means for removably suspending said plant or seed. In an embodiment, the third component comprises a means for delivering said liquid to said plant or seed. In an embodiment, the first form of at least a portion of said vessel support and the second form of at least a portion of said vessel, complement such that when said vessel is set upon said vessel support, said first and second electrically conductive materials are engaged and said engagement is maintained. In an embodiment, the vessel support means for frictionally engaging comprises an angled-upward-facing surface portion and said vessel means for frictionally engaging comprises an about complementing angled-downward-facing surface portion. In an embodiment, the first and second electrically conductive materials are on said angled-upward-facing surface portion and said angled-downward-facing surface portion respectively. In an embodiment, the vessel support means for frictionally engaging also comprises an angled-side-facing surface portion for contacting a side of said vessel and maintaining said engagement.

This invention provides a device for growing a plant or germinating a seed into a plant, said device comprising: a vessel support comprising: a first electrically conductive material; a means for receiving electricity; means for delivering said electricity to said first electrically conductive material; and a means for frictionally engaging said first electrically conductive material with a second electrically conductive material; a vessel comprising: said second electrically conductive material; a means for frictionally engaging said second electrically conductive material with said first electrically conductive material; means for containing a liquid; means for removably suspending said plant or seed; a third component for delivering said liquid to said plant or seed that requires electricity; a means for delivering electricity from said second electrically conductive material to said third component; whereby when said vessel is place upon said vessel support, said first and second electrically conductive materials are reversibly frictionally engaged and electricity can flow from said first electrically conductive material to said second electrically conductive material.

This invention provides a method for growing a plant or germinating a seed into a plant, said method comprising: providing a liquid delivery device or system of this invention; providing said plant or seed; providing said liquid; reversibly engaging or contacting said vessel and said vessel support thereby engaging or contacting said first and second electrically conductive materials; providing electricity to said vessel support; and delivering said liquid to said seed or plant; whereby said seed grows or said plant germinates. In an embodiment, the method further comprises disengaging said vessel and said vessel support thereby disengaging said first and second electrically conductive materials.

This invention provides a method for growing a plant or germinating a seed into a plant, said method comprising: providing a device for growing a plant or germinating a seed into a plant, said device comprising: a vessel support comprising: a first electrically conductive material; a means for receiving electricity; means for delivering said electricity to said first electrically conductive material; and a means for frictionally engaging said first electrically conductive material with a second electrically conductive material; a vessel comprising: said second electrically conductive material; a means for frictionally engaging said second electrically conductive material with said first electrically conductive material; means for containing a liquid; means for removably suspending said plant or seed; a third component for delivering said liquid to said plant or seed that requires electricity; a means for delivering electricity from said second electrically conductive material to said third component; whereby when said vessel is engaged with said vessel support, said first and second electrically conductive materials are reversibly frictionally engaged or contacted and electricity can flow from said first electrically conductive material to said second electrically conductive material; providing said plant or seed; providing said liquid; reversibly engaging or contacting said vessel and said vessel support thereby engaging or contacting said first and second electrically conductive materials; providing electricity and delivering said electricity to said vessel support; and delivering said liquid to said seed or plant; whereby said seed grows or said plant germinates.

In an embodiment, a power cord comes into the vessel support base component from wall 110 VAC, a device for splitting the power, a transformer for converting a first portion of the electricity to 12V AC to be directed ultimately to a pump and controller circuit board, a second portion of electricity that stays 110 VAC power and devices that switch it and control it via the controller board, devices allowing the second portion to leave the vessel support and travel to the photoradiation hood to power the photoradiation delivery components, means for switching the photoradiation devices on and off automatically via the controller board or manually through the controller board, components allowing the first portion to leave the vessel support base and enter the vessel support arm through gold-plated connectors and contacts, components allowing the 12V AC power to travel along wires to gold-plated spring steel contacts which travel through the vessel support arm connector cap which houses the contacts, components allowing the contacts to be exposed on the outside of the vessel support arm facing the vessel, wherein the vessel is covered by two plates for delivering liquid, and a pump tower is connected to and/or part of the lower plate and that rests inside the vessel, wherein the pump tower contains nickel-plated steel contacts which are configured to come into contact with the gold-plated spring steel contacts mounted in the vessel support arm carrying 12V AC, wherein the pump tower comprises a pump over-mold connector, and the pump tower carries power from the plated contacts to an over-molded power cord to the submersible 12V pump, wherein the pump receives power when the covered vessel rests in the vessel support and an electrical connection is made, wherein the pump then delivers water up the pump tower to be delivered between the about parallel plates for distribution to the individual grow openings, seeds, plants, grow media contacting said seeds or plants. In an embodiment, any or all of the components described in this paragraph are optional and can be removed.

In an embodiment, when the activator or switch is activated, the pump is able to start operating. In an embodiment, although the pump is able to start operating, a smart garden device

EXAMPLE 1

A hydroponics device of this invention is or comprises a system for providing liquid to a plant or a seed that can germinate into a plant. The device is shown in FIG. 1. This device is use to grow herbs. When the liquid within the device needs to be changed, the vessel is lifted off of the vessel base, and the liquid stops flowing to the plants. The liquid is changed. The vessel is placed back on the vessel base and the liquid again flows to the plants.

Although this invention has been described with respect to specific embodiments, it is not intended to be limited thereto, and various modifications which will become apparent to the person of ordinary skill in the art are intended to fall within the scope of the invention as described herein, taken in conjunction with the accompanying drawings and the appended claims.

All references cited are incorporated herein by reference to the extent that they are not inconsistent with the disclosure herein.

The invention claimed is:

1. A hydroponic system for providing liquid to a plant or a seed that can germinate into a plant, said system comprising:
   a) a liquid delivery device;
   b) an actuator for controlling delivery of liquid to the plant or seed;
   c) an electronic controller circuit board operatively connected to said liquid delivery device and said actuator;
   d) a vessel comprising a first component of said actuator; and
   e) a vessel support removably attached to said vessel and comprising a second component of said actuator;
   wherein said actuator is controlled by said electronic controller circuit board and is electrically operable only when said vessel is brought into contact with said vessel support such that said first component of said actuator contacts said second component of said actuator to form a complete electric circuit; f) a vessel cover; g) a plant or seed located in said vessel, wherein the plant or seed grows through an opening in said vessel cover.

2. The system of claim 1 wherein said liquid delivery device comprises a submersible pump.

3. The system of claim 1 wherein said actuator causes said liquid delivery device to deliver said liquid by providing energy to said liquid delivery device.

4. The system of claim 1 wherein said actuator is a switch.

5. The system of claim 1, wherein said first component and/or said second component is a characteristic selected from the group consisting of: elastic, springing, reversibly bendable, and bendably biased outwards.

6. The system of claim 1, said first component comprises gold-plated spring steel.

7. The system of claim 1, wherein said second component comprises nickel-plated steel.

8. The system of claim 1 wherein said liquid is aqueous and comprises plant nutrients.

9. The system of claim 1 wherein said liquid is not delivered to said plant or seed when said vessel is moved out of proximity with said vessel support.

10. The system of claim 1, wherein said vessel comprises an electrical contact unit and said vessel support comprises a complementary electrical contact unit such that said actuator is operable only when said electrical contact unit is in contact with said complementary electrical contact unit.

11. A hydroponic method for providing liquid to a plant or a seed that can germinate into a plant, said method comprising: a) providing a system of claim 1; b) providing a plant or seed; c) providing a liquid; and d) delivering said liquid to said plant or seed using said system.

12. A hydroponic method for reversibly providing liquid to a plant or a seed that can germinate into a plant, said method comprising:
   a) providing an actuable device, said device comprising:
      i) a liquid delivery device;
      ii) an actuator for controlling delivery of liquid to the plant or seed;
      iii) an electronic controller circuit board operatively connected to the liquid delivery device and the actuator;
      iv) a vessel comprising a first component of said actuator; and
      v) a vessel support comprising a second component of said actuator;
         wherein said actuator is controlled by said electronic controller circuit board and is electrically operable by forming a complete electric circuit only when said vessel is brought into contact with said vessel support such that said first component of said actuator contacts said second component of said actuator;
   b) providing a plant or seed;
   c) providing a liquid; and
   d) using said actuable device to deliver said liquid to said plant or seed; wherein said plant or seed located in said vessel grows through an opening in a cover on said vessel.

13. The method of claim 12 further comprising reversibly moving said vessel into proximity with said vessel support.

14. A hydroponic system for providing liquid to a plant or a seed that can germinate into a plant, said system comprising:
   a) a liquid delivery device;
   b) an actuator for controlling said liquid delivery device;
   c) an electronic controller circuit board operatively connected to said liquid delivery device and said actuator, wherein said electronic controller circuit board comprises an on/off switch;
   d) a vessel comprising a first partial electrical circuit; and
   e) a vessel support comprising a second partial electrical circuit;
   wherein said actuator is electrically operable only when said vessel is placed on said vessel support such that said first partial electrical circuit contacts said second partial electrical circuit to form a complete electric circuit of said actuator, thereby allowing said actuator to be controlled by said on/off switch of said electronic controller circuit board; f)a vessel cover; g)a plant or seed located in siad vessel, wherein the plant or seed grows through an opening in said vessel cover.

15. The system of claim 14 further comprising an artificial light source.

16. The system of claim 15, wherein said actuator is capable of controlling said artificial light source.

* * * * *